United States Patent
Alfred et al.

(10) Patent No.: US 12,371,153 B2
(45) Date of Patent: Jul. 29, 2025

(54) ERROR MONITORS FOR COLLECTIVE AND CYCLIC STICKS

(71) Applicant: Textron Innovations Inc., Providence, RI (US)

(72) Inventors: Jillian Samantha Alfred, Ft. Worth, TX (US); Lan Nam Hoang, Keller, TX (US); Clifton Lee Harrell, Arlington, TX (US)

(73) Assignee: TEXTRON INNOVATIONS INC., Providence, RI (US)

(*) Notice: Subject to any disclaimer, the term of this patent is extended or adjusted under 35 U.S.C. 154(b) by 352 days.

(21) Appl. No.: 17/813,128

(22) Filed: Jul. 18, 2022

(65) Prior Publication Data

US 2024/0017820 A1 Jan. 18, 2024

(51) Int. Cl.
| B64C 27/32 | (2006.01) |
| B64C 13/04 | (2006.01) |
| B64C 13/08 | (2006.01) |
| B64C 13/12 | (2006.01) |
| B64C 13/50 | (2006.01) |
| B64C 27/00 | (2006.01) |
| B64C 27/467 | (2006.01) |
| B64D 31/06 | (2024.01) |

(52) U.S. Cl.
CPC ...... *B64C 13/0421* (2018.01); *B64C 13/0427* (2018.01); *B64C 13/08* (2013.01)

(58) Field of Classification Search
CPC .. B64C 13/0421; B64C 13/0427; B64C 13/08
USPC ........................................................... 701/3
See application file for complete search history.

(56) References Cited

U.S. PATENT DOCUMENTS

| 3,439,321 | A | 4/1969 | Sebern |
| 3,493,836 | A | 2/1970 | Nelson |
| 5,863,012 | A | 1/1999 | Rollet et al. |
| 10,926,871 | B2* | 2/2021 | Alfred ...................... B64C 27/56 |
| 2012/0053762 | A1* | 3/2012 | Stiefenhofer ......... B64C 13/507 701/3 |
| 2012/0205494 | A1 | 8/2012 | Taylor |
| 2014/0027565 | A1* | 1/2014 | Marvin ................ G05D 1/0816 244/17.13 |
| 2017/0345318 | A1* | 11/2017 | Kim ........................ G08G 5/76 |
| 2018/0170524 | A1* | 6/2018 | Blanc ................... G05D 1/0858 |
| 2018/0229831 | A1 | 8/2018 | Melton et al. |
| 2019/0161182 | A1* | 5/2019 | Alfred .................. G05D 1/0061 |

(Continued)

*Primary Examiner* — Jonathan M Dager
*Assistant Examiner* — Laura E Linhardt
(74) *Attorney, Agent, or Firm* — SLATER MATSIL, LLP

(57) ABSTRACT

In an embodiment, a rotorcraft includes a control element; a first detent sensor connected to the control element, the first detent sensor being operable to generate detent slip rate data indicating movement of the control element and detent state data indicating pilot control of the control element; a first trim motor connected to the control element and operable to generate trim rate data; and an FCC in signal communication with the first detent sensor and the first trim motor, the FCC including an error monitor operable to compare the detent slip rate data with the trim rate data and determine whether the first detent sensor is functional or defective, operable to provide a first flight management function when the first detent sensor is determined to be functional, and operable to provide a second flight management function when the first detent sensor is determined to be defective.

16 Claims, 14 Drawing Sheets

(56) References Cited

U.S. PATENT DOCUMENTS

2020/0070966 A1\* 3/2020 Alfred .................... B64C 27/006
2024/0017820 A1\* 1/2024 Alfred ................. B64C 13/0421

\* cited by examiner

ERROR MONITORS FOR COLLECTIVE AND CYCLIC STICKS

TECHNICAL FIELD

The present invention relates generally to a system and method for automated flight control in a rotorcraft, and, in particular embodiments, to a system and method for determining when a detent sensor or a trim motor is defective, and providing flight management functions accordingly.

BACKGROUND

A rotorcraft may include one or more rotor systems including one or more main rotor systems. A main rotor system generates aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system. For smooth and efficient flight in a rotorcraft, a pilot balances the engine power, main rotor collective thrust, main rotor cyclic thrust and the tail rotor thrust, and a control system may assist the pilot in stabilizing the rotorcraft and reducing pilot workload.

SUMMARY

In accordance with an embodiment, a rotorcraft includes a control element; a first detent sensor connected to the control element, the first detent sensor being operable to generate detent slip rate data indicating movement of the control element and detent state data indicating pilot control of the control element; a first trim motor connected to the control element, the first trim motor being operable to generate trim rate data; and a flight control computer (FCC) in signal communication with the first detent sensor and the first trim motor, the FCC including an error monitor, the error monitor being operable to compare the detent slip rate data with the trim rate data and determine whether the first detent sensor is functional or defective, the FCC being further operable to provide a first flight management function when the first detent sensor is determined to be functional, and the FCC being further operable to provide a second flight management function when the first detent sensor is determined to be defective. In an embodiment, the error monitor is further operable to compare the detent state data with the detent slip rate data and the trim rate data to determine whether the first detent sensor is functional or defective. In an embodiment, the FCC is further operable to generate trim command data, and the error monitor is operable to detect whether the trim rate data is initiated by and in agreement with the trim command data and determine whether the first trim motor is functional or defective. In an embodiment, the FCC is further operable to provide the first flight management function when the first trim motor is determined to be functional, and the FCC is further operable to provide the second flight management function when the first trim motor is determined to be defective. In an embodiment, the error monitor is further operable to compare the detent state data with the trim rate data and the trim command data to determine whether the first trim motor is functional or defective. In an embodiment, the second flight management function turns off outer loop augmentation. In an embodiment, the error monitor is a persistence monitor.

In accordance with another embodiment, a flight control computer (FCC) for a rotorcraft includes a processor; and a non-transitory computer-readable storage medium storing a program to be executed by the processor, the program including instructions for monitoring a functionality of a first detent sensor connected to a first control element, the instructions for monitoring the functionality including instructions for receiving detent slip rate data from the first detent sensor indicating pilot commands to the first control element; receiving trim rate data from a trim motor connected to the first control element; comparing the trim rate data to the detent slip rate data; determining a functionality status of the first detent sensor according to the detent slip rate data and the trim rate data; and providing a first flight management function in response to the first detent sensor being determined to be functional, and providing a second flight management function in response to the first detent sensor being determined to be non-functional. In an embodiment, the instructions for monitoring the functionality further including instructions for receiving detent state data from the first detent sensor indicating whether the first control element is in an in-detent state or an out-of-detent state. In an embodiment, the instructions for monitoring the functionality further including instructions for increasing an error count when the detent state data indicates the first control element is in the in-detent state and the detent slip rate data is in conflict with the trim rate data. In an embodiment, the instructions for monitoring the functionality further include decreasing the error count when the detent state data indicates the first control element is in the in-detent state and the detent slip rate data is in agreement with the trim rate data. In an embodiment, the first detent sensor is determined to be functional in response to the error count being less than a threshold value, and the first detent sensor is determined to be non-functional in response to the error count being equal to or greater than the threshold value. In an embodiment, the instructions for monitoring the functionality further include instructions for comparing the trim rate data to the detent slip rate data; and determining a functionality status of the trim motor according to the comparison of the trim rate data to the detent slip rate data. In an embodiment, the first flight management function provides inner loop flight augmentation, rate loop flight augmentation, and outer loop flight augmentation, and the second flight management function turns off the outer loop flight augmentation.

In accordance with yet another embodiment, a method for operating a rotorcraft includes receiving control element rate data from a first detent sensor indicating pilot commands to a first control element, the first detent sensor being connected to the first control element; receiving trim rate data from a trim motor connected to the first control element; comparing the trim rate data to the control element rate data; determining a functionality status of the first detent sensor according to the control element rate and the trim rate data; and providing a first flight management function in response to the first detent sensor being determined to be functional, and providing a second flight management function in response to the first detent sensor being determined to be non-functional. In an embodiment, the method further includes receiving detent state data from the first detent sensor indicating whether the first control element is in an in-detent state or an out-of-detent state. In an embodiment, the method further includes increasing an error count when the detent state data indicates the first control element is in the in-detent state and the trim rate data is in disagreement with the control element rate data. In an embodiment, the method further includes decreasing the error count when the detent state data indicates the first control element is in the in-detent state and the trim rate data is in agreement with the control element rate data. In an embodiment, the functionality status of the first detent sensor is determined to be functional when the error count is less than a threshold value, and the functionality status of the first detent sensor is determined to be non-functional when the error count is equal to or greater than the threshold value. In an embodiment, the method further includes comparing the trim rate data to the control element rate data; determining a functionality status of the trim motor according to the trim rate data and the control element rate data; and providing a first flight management function in response to the trim motor being determined to be functional, and providing a second flight management function in response to the trim motor being determined to be non-functional.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
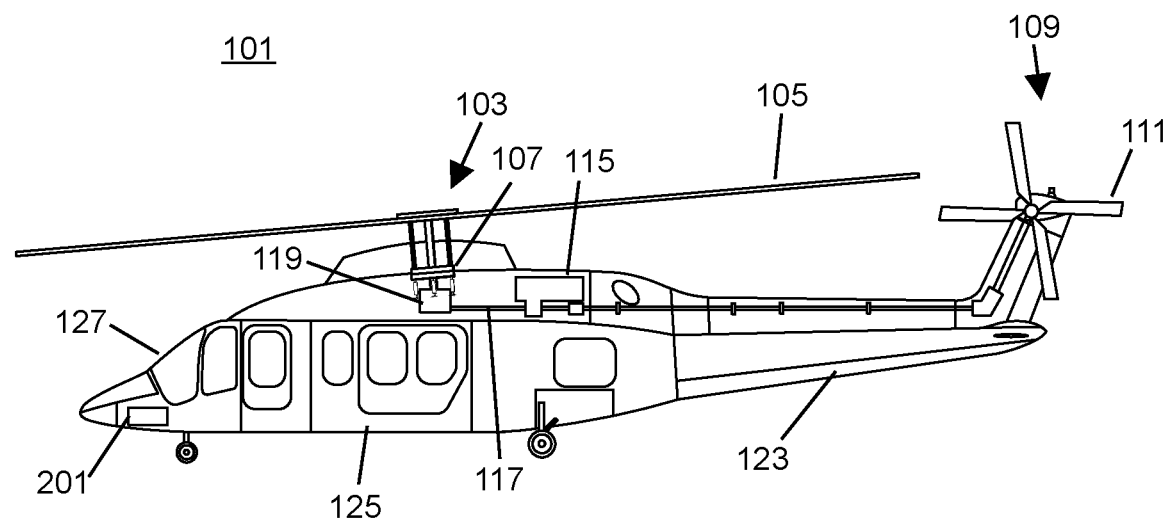
FIG. 1 illustrates a rotorcraft according to some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower," and other like terms used to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft have become more pronounced. Rotorcraft use one or more main rotors to simultaneously provide lift, control attitude, control altitude, and provide translational movement. Different flight parameters and controls are tightly coupled to each other, as the aerodynamic characteristics of the main rotors affect each control and movement axis. The flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight. The increase in collective requires increased power at the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. An FBW system may provide different control characteristics or responses for cyclic, pedal, or collective control input in the different flight regimes, and may provide stability assistance or enhancement by decoupling physical flight characteristics. This relieves a pilot from needing to compensate for some flight commands issued to the rotorcraft. The FBW system may be implemented in one or more flight control computers (FCCs) disposed between the pilot controls and flight control systems, providing corrections to flight controls that assist in operating the rotorcraft more efficiently or that put the rotorcraft into a stable flight mode, while still allowing the pilot to override the controls suggested by the FBW system. The FBW system in a rotorcraft may automatically adjust power output by an engine to match a collective control input, apply collective or power correction during a cyclic control input, provide automation of one or more flight control procedures, provide for default or suggested control positioning, or the like.

The FBW system for a rotorcraft provides stable flight characteristics for FBW-controlled flight parameters, while permitting the pilot to override or work with any flight parameters suggested by the FBW system. In providing enhanced control and automated functionality for rotorcraft flight, the FBW system maintains an intuitive and easy to use flight control system for the pilot. Thus, the FBW system adjusts the pilot controls so that the pilot controls are in a position associated with relevant flight parameters. For example, the FBW system may adjust the collective stick to provide a suggested or FBW-controlled flight parameter, and which reflects a collective or power setting. Thus, when the pilot releases the collective stick and the FBW system provides collective control commands, the collective stick is positioned intuitively in relation to the actual power or collective setting. When the pilot grasps the collective stick to retake control, the collective stick is positioned where the pilot expects the collective stick to be positioned for the actual collective setting of the main rotor. Similarly, the FBW system uses the cyclic stick to, for example, adjust for turbulence, drift or other disturbances to the flight path, and may move the cyclic stick as the FBW system compensates the cyclic control. Thus, when the pilot grasps the cyclic stick to take control of flight from the FBW system, the cyclic stick is positioned to reflect the actual cyclic settings.

Embodiments of the system and method described herein are directed to a system and method for determining whether a detent sensor and/or a trim motor are operating properly. This system may be referred to as a stuck-in-detent (SID) monitor. A rotorcraft may include detent sensors, which detect when a pilot is operating a particular pilot control in the rotorcraft. The rotorcraft further includes trim motors, which may be used to intuitively position particular pilot controls and provide tactile feedback to the particular pilot controls. An FBW system may detect that the pilot has control of, or is manipulating, a particular pilot control, and determine that pilot control is out-of-detent (OOD). Likewise, the FBW system may determine that the stick is in-detent (ID) when the FBW system detects that the pilot has released a particular pilot control. The FBW system may provide different flight profiles, flight management functions, automated flight functions, tactile feedback through the pilot controls, and the like depending on the determined detent state of the pilot controls. In some embodiments, the FBW system may use a state machine to track a detent state reflecting pilot inputs from a pilot control.

In some embodiments, the FBW system receives signals from sensors connected to the pilot controls, either directly or indirectly, that indicate whether the pilot is manually controlling the pilot controls. These sensors may be detent sensors configured to detect pilot inputs, while avoiding reporting any inputs or movements caused by the FBW system. The detent sensors may be separate from position sensors that detect the overall positions of the pilot controls and include both pilot inputs and FBW system inputs. The FBW system may provide pilot control positioning for automated flight processes by moving the pilot controls, such as by using the trim motors. The FBW system allows the pilot to override the pilot control positioning provided or suggested by the FBW system. In some embodiments, the FBW system provides the pilot control positioning using the trim motors, which may be connected to the pilot controls by a gradient spring, an electric clutch, another connection, or a transmission, such as a planetary gear set transmission. The detent sensors may, in some embodiments, determine the slip rate, which may be difference in the actual pilot control position compared to the position of the trim motor, or may be a difference in the trim motor drive speed compared to the speed of rotation of a shaft driven by the pilot controls. For example, in embodiments where the trim motor is connected to the pilot controls by a gradient spring, the detent sensors may determine the slip rate according to compression of the gradient spring indicated by a detent signal, which indicates the pilot control position in relation to the trim motor position. In embodiments where the trim motor is connected to the pilot controls by an electric clutch, the detent sensors may determine the rate at which the pilot controls caused the clutch to slip in relation to the trim motor position. The clutch slip rate may be a speed differential or a position differential. In embodiments where the trim motor is connected to the pilot controls by a transmission, such as a planetary gear set transmission, the detent sensors may be disposed on a secondary output that handles pilot inputs, and may determine the pilot inputs from the position of the secondary output.

FIG. 1 illustrates a rotorcraft 101 according to some embodiments. The rotorcraft 101 has a main rotor system 103, which includes a plurality of main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In embodiments in which the rotorcraft 101 includes the tail rotor 109, the pitch of each tail rotor blade 11 is collectively changed in order to vary the thrust of the anti-torque system, providing directional control of the rotorcraft 101. The pitch of the tail rotor blades 111 is changed by one or more tail rotor actuators. In some embodiments, a fly-by-wire (FBW) flight control system 201 included in the rotorcraft 101 sends electrical signals to the tail rotor actuators or main rotor actuators to control flight of the rotorcraft 101.

Power is supplied to the main rotor system 103 and the anti-torque system by engines 115. There may be one or more engines 115, which may be controlled according to signals from the FBW flight control system 201. The output of the engines 115 is provided to a driveshaft 117, which is mechanically and operatively coupled to the main rotor system 103 and the anti-torque system through a main rotor transmission 119 and a tail rotor transmission, respectively.

The rotorcraft 101 includes a fuselage 125 and tail section 123. The tail section 123 may have other flight control devices such as horizontal or vertical stabilizers, rudder, elevators, or other control or stabilizing surfaces that are used to control or stabilize flight of the rotorcraft 101. The fuselage 125 includes a cockpit 127, which includes displays, controls, and instruments. Although the rotorcraft 101 is depicted as having certain illustrated features, the rotorcraft 101 may have a variety of implementation-specific configurations. For instance, in some embodiments, the cockpit 127 is configured to accommodate a pilot or a pilot and co-pilot, as illustrated. It is also contemplated that rotorcraft 101 may be operated remotely, in which case the cockpit 127 may be configured as a fully functioning cockpit that may accommodate a pilot and/or a co-pilot to provide for greater flexibility of use. The rotorcraft 101 may be configured with a cockpit having limited functionality (e.g., a cockpit with accommodations for a pilot, who may operate with a remote co-pilot, or who may operate as a co-pilot or back-up pilot with the primary piloting functions being performed remotely). In some embodiments, the rotorcraft 101 may be configured as an unmanned vehicle, in which case the cockpit 127 may be omitted to save space and cost.

Figure 2:
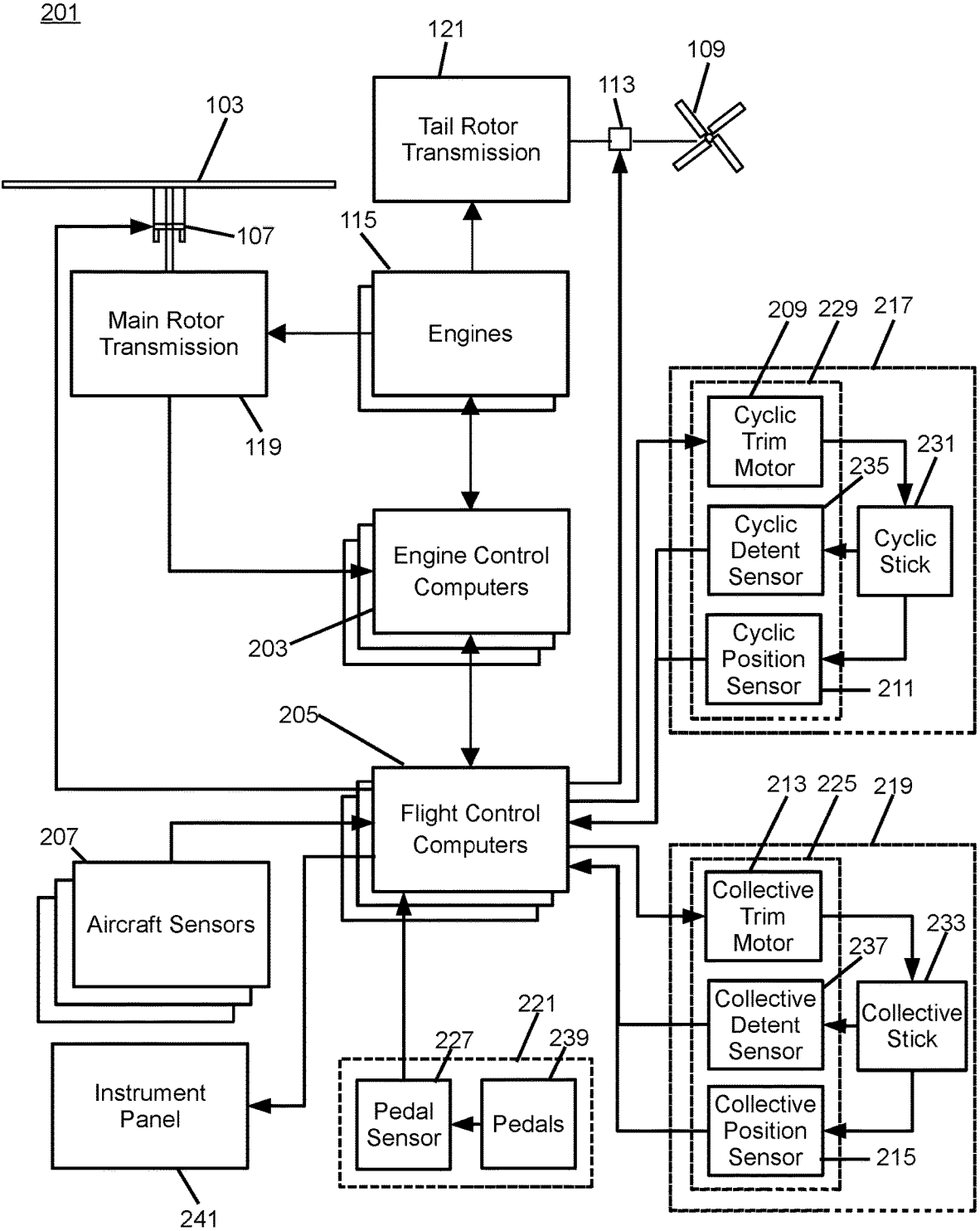
FIG. 2 illustrates a fly-by-wire flight control system for a rotorcraft according to some embodiments.

FIG. 2 illustrates the FBW flight control system 201 for a rotorcraft 101 according to some embodiments. A pilot may manipulate one or more pilot flight controls in order to control flight of the rotorcraft 101. The pilot flight controls may include manual controls such as a cyclic stick 231 in a cyclic control assembly 217, a collective stick 233 in a collective control assembly 219, and pedals 239 in a pedal control assembly 221. Inputs provided by the pilot to the pilot flight controls may be transmitted mechanically and/or electronically (e.g., via the FBW flight control system 201) to flight control devices by the FBW flight control system 201.

The flight control devices may represent devices operable to change the flight characteristics of the rotorcraft 101. The flight control devices on the rotorcraft 101 may include mechanical and/or electrical systems operable to change the positions or angle of attack of the main rotor blades 105 and the tail rotor blades 11 or to change the power output of the engines 115, as examples. The flight control devices include systems such as the swashplate 107, the tail rotor actuator 113, and systems operable to control the engines 115. The FBW flight control system 201 may adjust the flight control devices independently of the flight crew in order to stabilize the rotorcraft 101, reduce the workload of the flight crew, and the like. The FBW flight control system 201 includes engine control computers (ECCUs) 203, flight control computers (FCCs) 205, and aircraft sensors 207, which collectively adjust the flight control devices.

The FBW flight control system 201 has one or more FCCs 205. In some embodiments, multiple FCCs 205 are provided for redundancy. One or more modules within the FCCs 205 may be partially or wholly embodied as software and/or hardware for performing any of the functionality described herein. In some embodiments, the FCCs 205 may analyze pilot inputs and dispatch corresponding commands to the ECCUs 203, the tail rotor actuator 113, and/or actuators for the swashplate 107. Further, the FCCs 205 are configured and receive input commands from the pilot flight controls through sensors associated with each of the pilot flight controls. The input commands are received by measuring the positions of the pilot flight controls. The FCCs 205 also control tactile cues to the pilot flight controls or display information in instruments on, for example, an instrument panel 241.

The ECCUs 203 control the engines 115. For example, the ECCUs 203 may vary the output power of the engines 115 to control the rotational speed of the main rotor blades or the tail rotor blades. The ECCUs 203 may control the output power of the engines 115 according to commands from the FCCs 205, or may do so based on feedback such as measured revolutions per minute (RPM) of the main rotor blades 105.

The aircraft sensors 207 are in communication with the FCCs 205. The aircraft sensors 207 may include sensors for measuring a variety of rotorcraft systems, flight parameters, environmental conditions and the like. For example, the aircraft sensors 207 may include sensors for measuring airspeed, altitude, attitude, position, orientation, temperature, airspeed, vertical speed, and the like. Other aircraft sensors 207 could include sensors relying upon data or signals originating external to the rotorcraft 101, such as a global positioning system (GPS) sensor, a VHF Omnidirectional Range sensor, an Instrument Landing System (ILS), and the like.

The cyclic control assembly 217 is connected to a cyclic trim assembly 229 having one or more cyclic position sensors 211, one or more cyclic detent sensors 235, and one or more cyclic actuators or cyclic trim motors 209. The cyclic position sensors 211 measure the position of the cyclic stick 231. In some embodiments, the cyclic stick 231 is a single control stick that moves along two axes and permits a pilot to control pitch, which is the vertical angle of the nose of the rotorcraft 101 and roll, which is the side-to-side angle of the rotorcraft 101. In some embodiments, the cyclic control assembly 217 has separate cyclic position sensors 211 that measure roll and pitch separately. The cyclic position sensors 211 for detecting roll and pitch generate roll and pitch signals, respectively, (sometimes referred to as cyclic longitude and cyclic latitude signals, respectively) which are sent to the FCCs 205. The FCCs 205 may then control the swashplate 107, the engines 115, the tail rotor 109, or related flight control devices according to the cyclic position signal to control the pitch and roll of the rotorcraft 101.

The cyclic trim motors 209 are connected to the FCCs 205, and receive signals from the FCCs 205 to move the cyclic stick 231. In some embodiments, the FCCs 205 determine a suggested cyclic stick position for the cyclic stick 231 according to one or more of the collective stick position; the pedal position; the speed, altitude, and attitude of the rotorcraft 101; the engine RPM; the engine temperature; the main rotor RPM; the engine torque; other rotorcraft system conditions; flight conditions; or according to a predetermined function selected by the pilot. The suggested cyclic stick position is a positon determined by the FCCs 205 to give a desired cyclic action. In some embodiments, the FCCs 205 send a suggested cyclic stick position signal indicating the suggested cyclic stick position to the cyclic trim motors 209. While the FCCs 205 may command the cyclic trim motors 209 to move the cyclic stick 231 to a particular position (which would in turn drive actuators associated with swashplate 107 accordingly), the cyclic position sensors 211 detect the actual position of the cyclic stick 231 that is set by the cyclic trim motors 209 or input by the pilot, allowing the pilot to override the suggested cyclic stick position. The cyclic trim motor 209 is connected to the cyclic stick 231 so that the pilot may move the cyclic stick 231 while the cyclic trim motor 209 is driving the cyclic stick 231 to override the suggested cyclic stick position. Thus, in some embodiments, the FCCs 205 receive a signal from the cyclic position sensors 211 indicating the actual cyclic stick position, and do not rely on the suggested cyclic stick position to command the swashplate 107.

Similar to the cyclic control assembly 217, the collective control assembly 219 is connected to a collective trim assembly 225 having one or more collective position sensors 215, one or more collective detent sensors 237, and one or more collective actuators or collective trim motors 213. The collective position sensors 215 measure the position of a collective stick 233 in the collective control assembly 219. In some embodiments, the collective stick 233 is a single control stick that moves along a single axis or with a lever type action. A collective position sensor 215 detects the position of the collective stick 233 and sends a collective position signal to the FCCs 205. The FCCs 205 may then control the swashplate 107, the engines 115, the tail rotor 109, or related flight control devices according to the collective position signal to control the vertical movement of the rotorcraft 101. In some embodiments, the FCCs 205 may send a power command signal to the ECCUs 203 and a collective command signal to the swashplate 107 so that the angle of attack of the main rotor blades 105 is raised or lowered collectively, and the engine power is set to provide the needed power to keep the RPM of the main rotor blades 105 substantially constant.

The collective trim motor 213 is connected to the FCCs 205, and receives signals from the FCCs 205 to move the collective stick 233. Similar to the determination of the suggested cyclic stick position, in some embodiments, the FCCs 205 determine a suggested collective stick position for the collective stick 233 according to one or more of the cyclic stick position; the pedal position; the speed, altitude, and attitude of the rotorcraft 101; the engine RPM; the engine temperature; the main rotor RPM; the engine torque; other rotorcraft system conditions; flight conditions; or according to a predetermined function selected by the pilot. The FCCs 205 generate the suggested collective stick position and send a corresponding suggested collective stick signal to the collective trim motors 213 to move the collective stick 233 to a particular position. The collective position sensors 215 detect the actual position of the collective stick 233 that is set by the collective trim motor 213 or input by the pilot, allowing the pilot to override the suggested collective stick position.

The pedal control assembly 221 has one or more pedal sensors 227 that measure the position of the pedals 239 or other input elements in the pedal control assembly 221. In some embodiments, the pedal control assembly 221 is free of a trim motor or actuator, and may have a mechanical return element that centers the pedals 239 when the pilot releases the pedals 239. In some embodiments, the pedal control assembly 221 has one or more trim motors that drive the pedals 239 to a suggested pedal position according to a signal from the FCCs 205. The pedal sensor 227 detects the position of the pedals 239 and sends a pedal position signal to the FCCs 205. The FCCs 205 control the tail rotor 109 to cause the rotorcraft 101 to yaw or rotate around a vertical axis.

The cyclic trim motor 209 and the collective trim motor 213 may drive the cyclic stick 231 and the collective stick 233, respectively, to suggested positions. The cyclic trim motor 209 and the collective trim motor 213 may further be used to provide tactile cueing to a pilot by providing driving forces to the cyclic stick 231 and the collective stick 233, respectively. The cyclic trim motor 209 and the collective trim motor 213 may push the cyclic stick 231 and the collective stick 233, respectively, in a particular direction when the pilot is moving the respective pilot flight control in order to indicate a particular condition. Because the FBW flight control system 201 mechanically disconnects the pilot flight controls from the flight control devices, a pilot may not feel a hard stop, vibration, or other tactile cue that would be inherent in pilot flight controls that are mechanically connected to a flight control assembly. In some embodiments, the FCCs 205 may cause the cyclic trim motor 209 and the collective trim motor 213 to push against a pilot command so that the pilot feels a resistive force, or may command one or more friction devices to provide friction felt when the pilot moves the pilot flight controls. Thus, the FCCs 205 control the feel of the pilot flight controls by providing pressure and/or friction on the pilot flight controls.

Additionally, the cyclic control assembly 217, the collective control assembly 219 and/or the pedal control assembly 221 may each have one or more detent sensors that determine whether the pilot is handling a particular control device. For example, the cyclic control assembly 217 includes a cyclic detent sensor 235 that determines that the pilot is interacting with the cyclic stick 231. The collective control assembly 219 includes a collective detent sensor 237 that determines that the pilot is interacting with the collective stick 233. The cyclic detent sensor 235 and the collective detent sensor 237 detect movement and/or positions of the respective pilot flight controls that is caused by pilot input, as opposed to movement and/or positions of the respective pilot flight controls that is caused by commands from the FCCs 205, rotorcraft vibration, and the like. The cyclic detent sensor 235 and the collective detent sensor 237 provide feedback signals indicative of the detent states of the respective pilot flight controls to the FCCs 205. When the FCCs 205 detect that a pilot has control of, or is manipulating, a particular pilot flight control, the FCCs 205 may determine that the respective pilot flight control is OOD. Likewise, the FCCs 205 may determine that the respective pilot flight control is ID when the signals from the cyclic detent sensor 235 or the collective detent sensor 237 indicate to the FCCs 205 that the pilot has released the respective pilot flight control. The FCCs 205 may provide different default control or automated commands to one or more flight systems based on the detent status of a particular pilot flight control.

Figure 3:
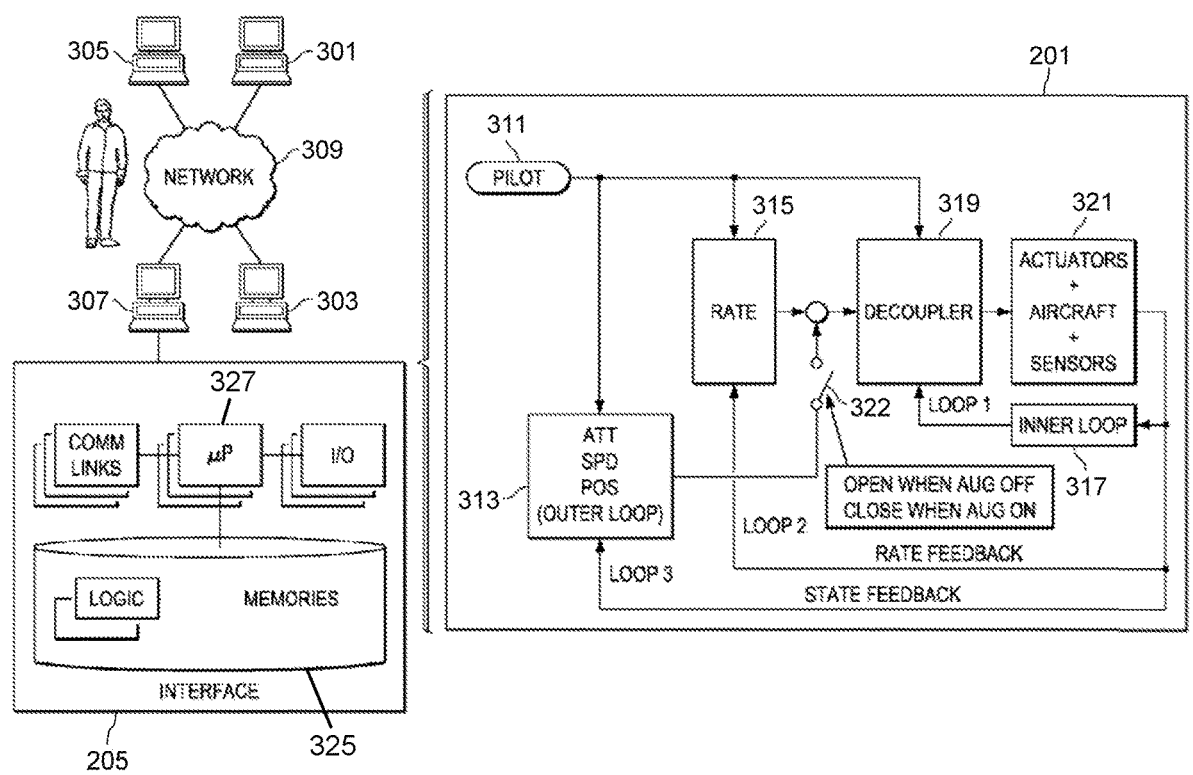
FIG. 3 illustrates a three-loop flight control system according to some embodiments.

FIG. 3 is a block diagram of the FBW flight control system 201, according to some embodiments. Some operational aspects of the FBW flight control system 201 are shown in a highly schematic fashion. In particular, the FBW flight control system 201 is schematically shown as being implemented as a series of inter-related feedback loops running certain control laws. Although the FBW flight control system 201 is illustrated as being a three-loop flight control system, it should be appreciated that the FBW flight control system 201 could be implemented in a different manner, such as with a different quantity of control loops.

In some embodiments, elements of the FBW flight control system 201 may be implemented at least partially by the FCCs 205. The FWB flight control system 201 may include components 301, 303, 305, and 307. All, some, or none of the components (301, 303, 305, 307) of the FBW flight control system 201 could be located externally to or remotely from the rotorcraft 101 and may communicate to on-board devices through a network connection 309.

The FBW flight control system 201 has a pilot input 311, an outer loop 313, a rate loop 315, an inner loop 317, a decoupler 319, and aircraft equipment 321 (corresponding to, e.g., flight control devices such as the swashplate 107, the tail rotor transmission 121, and the like; actuators (not separately illustrated) driving the flight control devices; sensors, such as the aircraft sensors 207, the cyclic position sensors 211, the collective position sensors 215, the cyclic detent sensors 235, the collective detent sensors 237, the pedal sensors 227, and the like; and the like). In the illustrated embodiment, a three-loop design separates the inner stabilization (e.g., the inner loop 317) and rate feedback (e.g., the rate loop 315) loops from outer guidance and tracking loops (e.g., the outer loop 313). The control law structure primarily assigns the overall stabilization task and related tasks of reducing pilot workload to the inner loop 317. The rate loop 315 (sometimes referred to as the middle loop) provides rate augmentation. The outer loop 313 focuses on guidance and tracking tasks. Since the inner loop 317 and the rate loop 315 provide most of the stabilization, less control effort is required by the outer loop 313. As illustrated in FIG. 3, a switch 322 (sometimes referred to as a force trim release (FTR)) may be provided to turn outer loop flight augmentation on and off (e.g., the outer loop 313). The tasks of the outer loop 313 are not necessary for flight stabilization.

In some embodiments, the inner loop 317 and the rate loop 315 include a set of gains and filters applied to roll/pitch/yaw 3-axis rate gyro and acceleration feedback sensors. Both the inner loop 317 and the rate loop 315 may stay active, independent of various outer loop hold modes or the switch 322. The outer loop 313 may include cascaded layers of loops, including an attitude loop, a speed loop, a position loop, a vertical speed loop, an altitude loop, and a heading loop. In some embodiments, the control laws running in the illustrated loops allow for decoupling of otherwise coupled flight characteristics, which in turn may provide for more stable flight characteristics and reduced pilot workload. Furthermore, the outer loop 313 may allow for automated or semi-automated operation of certain high-level tasks or flight patterns, thus further reducing pilot workload and allowing the pilot to focus on other matters, including observation of the surrounding terrain.

In some embodiments, the inner loop 317 may include a state machine that monitors pilot movement or handling of control elements, such as pilot flight controls or of an axis in the pilot flight controls. The inner loop 317 may use one or more state machines to determine the detent state of the pilot flight controls, and the FCCs 205 may use the determined detent state to implement one or more flight management functions from the rate loop 315 and/or the outer loop 313. For example, the inner loop 317 may have a detent state machine that tracks a detent state of the collective stick 233 according to movement of the pilot flight controls, mode selections, pilot trim selections, and the like. The outer loop 313 may have a vertical speed hold loop or function that is engaged when the collective stick 233 is ID. The vertical speed hold function may be a function implemented in the outer loop 313 that monitors the detent state determined in the detent state machine of the inner loop 317. If the vertical speed hold function determines that the collective stick 233 is ID, the vertical speed hold function may then attempt to position the collective stick 233 by driving the collective stick 233 to a position associated with the selected vertical speed. Similarly, if the vertical speed hold function determines that the collective stick 233 is OOD, the vertical speed hold function may cease driving the collective stick 233 to the selected vertical speed position to permit manual control by the pilot. The inner loop 317 and the outer loop 313 may each provide additional and/or different functionality when the collective stick 233 is OOD. Thus, the FCCs 205, using the inner loop 317, the outer loop 313, or a combination of loops, may engage one or more first flight management functions when a particular pilot flight control is determined to be ID, and may engage one or more second flight management functions when the pilot flight control is determined to be OOD. For example, an automatic navigation process, or other automated flight process may be engaged when the pilot flight control is ID.

The FBW flight control system 201 may be realized as programming executed by the FCCs 205. The programming includes instructions implementing aspects of the FBW flight control system 201. The FCCs 205 may include memories 325, such as non-transitory computer readable storage mediums, that store the programming. One or more processors 327 are connected to the memories 325, and are operable to execute the programming.

Figure 4A:
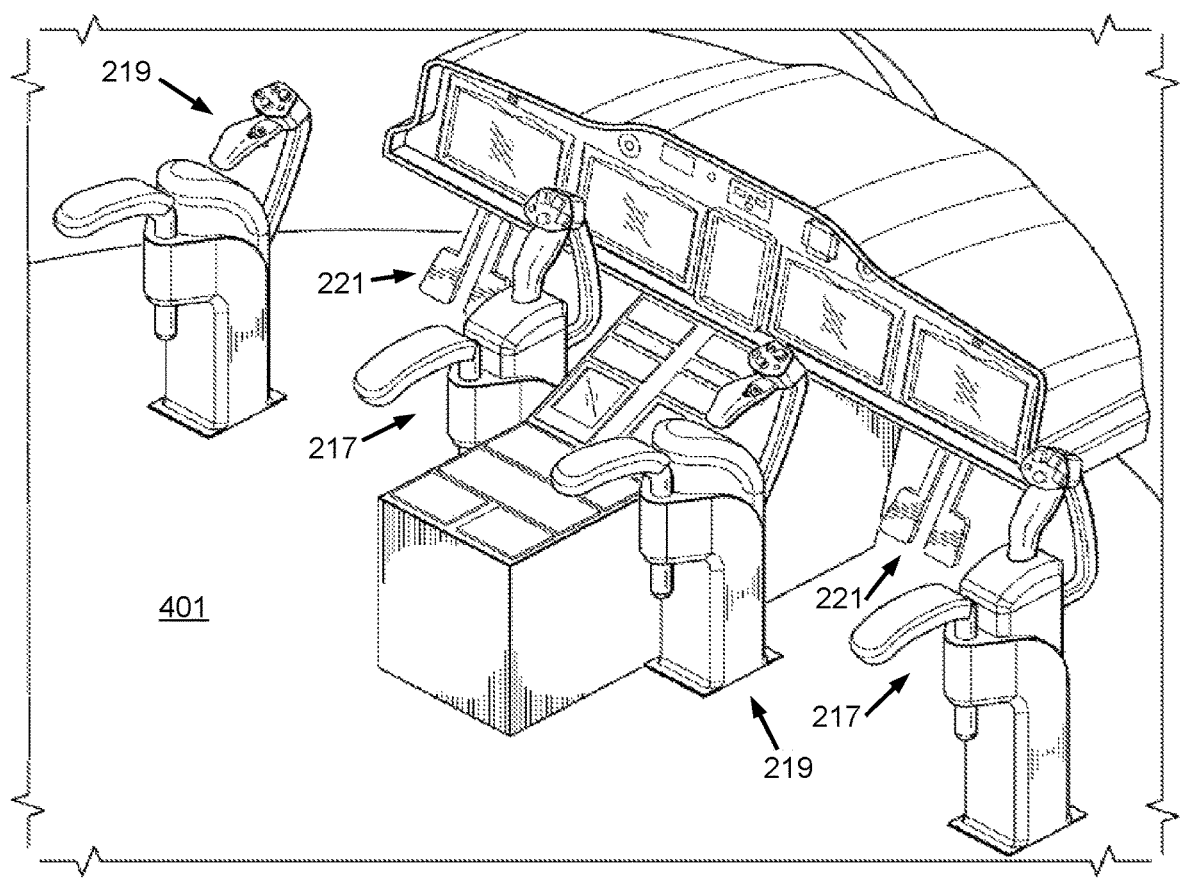
FIG. 4A illustrates a cockpit control arrangement according to some embodiments.
Figure 4B:
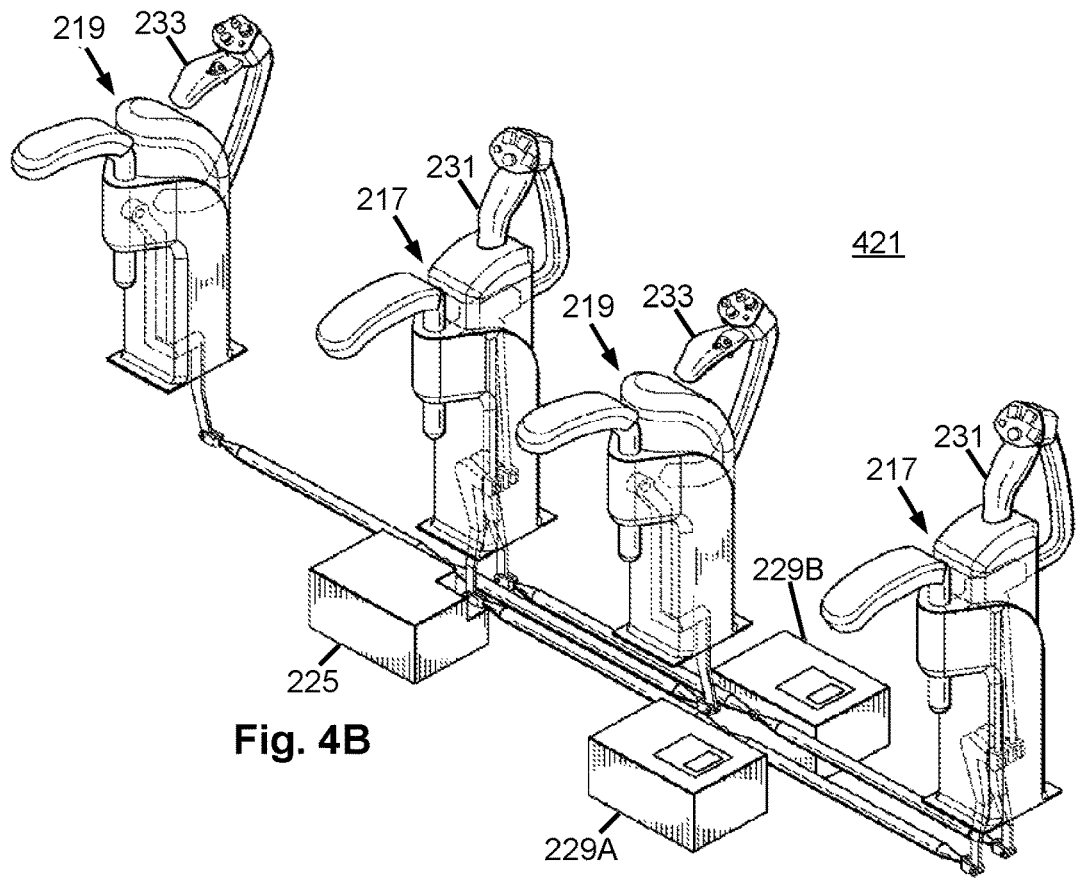
FIG. 4B illustrates an arrangement of cyclic and collective control assemblies according to some embodiments.
Figure 4C:
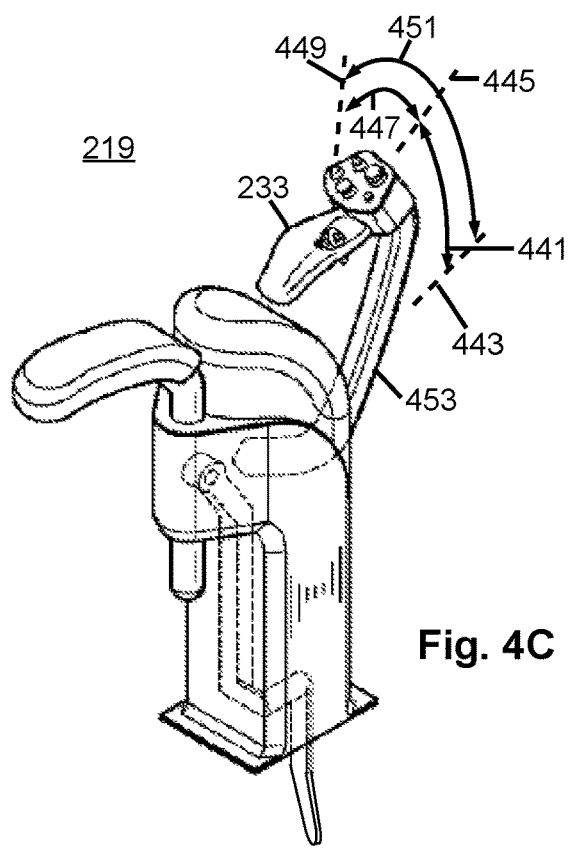
FIG. 4C illustrates a collective control assembly and range of motion according to some embodiments.

FIGS. 4A through 4C illustrate additional details of the cockpit 127 and the pilot flight controls. FIG. 4A is a diagram illustrating a cockpit control arrangement 421 according to some embodiments. In some embodiments, the rotorcraft 101 includes two sets of pilot flight controls in two flight control assemblies. Each set of pilot flight controls includes a cyclic control assembly 217, a collective control assembly 219, and a pedal control assembly 221. A flight control assembly including a set of pilot flight controls is provided for each pilot (which may include a pilot-in-command and a co-pilot or backup pilot).

In general, cyclic pilot flight controls allow a pilot to provide cyclic inputs through the cyclic control assembly 217 to set or adjust a cyclic configuration of the main rotor blades 105. The cyclic configuration of the main rotor blades 105 changes the angle of attack for each main rotor blade 105 as the main rotor system 103 rotates. This creates variable amounts of lift at varied points in the rotation cycle, causing the rotorcraft 101 to pitch or roll. Collective pilot flight controls allow the pilot to provide collective inputs through the collective control assembly 219 to set or adjust a collective configuration of the main rotor blades 105. The collective configuration of the main rotor blades 105 changes the angle of attack for all of the main rotor blades 105 collectively by equal amounts and at the same time. This results in ascent, descent, acceleration, and/or deceleration of the rotorcraft 101. Anti-torque pilot flight controls allow the pilot to change the amount of anti-torque force applied to the rotorcraft 101. The tail rotor blades 11 may operate to counter torque created by driving the main rotor system 103. The anti-torque pilot flight controls allow the pilot to provide pedal inputs through the pedal control assembly 221. The pedal inputs change the amount of anti-torque force applied by the tail rotor blades 11, which changes a heading of the rotorcraft 101. For example, providing an anti-torque force greater than the torque created by driving the main rotor system 103 causes the rotorcraft 101 to rotate in a first direction. Providing an anti-torque force less than the torque created by driving the main rotor system 103 causes the rotorcraft 101 to rotate in a second direction opposite the first direction. In some embodiments, the anti-torque pilot flight controls may change the amount of anti-torque force applied by changing pitches of the tail rotor blades 111, which increases or reduces the thrust produced by the tail rotor blades 111.

FIG. 4B is a diagram illustrating an arrangement of the cyclic control assembly 217 and the collective control assembly 219 in the cockpit control arrangement 421 according to some embodiments. In some embodiments, two cyclic control assemblies 217 and two collective control assemblies 219 are provided in the cockpit control arrangement 421. The cyclic control assemblies 217 each include a cyclic stick 231 coupled to a cyclic roll trim assembly 229A and a cyclic pitch trim assembly 229B. The collective control assemblies 219 each include a collective stick 233 coupled to a collective trim assembly 225. The cyclic roll trim assembly 229A, the cyclic pitch trim assembly 229B, and the collective trim assembly 225 are operable to receive and measure mechanical communications of cyclic and collective inputs from the pilot through the cyclic sticks 231 and the collective sticks 233. In some embodiments, two cyclic trim assemblies, the cyclic roll trim assembly 229A and the cyclic pitch trim assembly 229B, are provided and are connected to each of the cyclic control assemblies 217. The cyclic roll trim assembly 229A manages roll or left/right cyclic tilting movements. The cyclic pitch trim assembly 229B manages pitch or front/back tilting movements. In some embodiments, the cyclic roll trim assembly 229A, the cyclic pitch trim assembly 229B, and the collective trim assembly 225 convert mechanical inputs into roll, pitch, and collective position signals that are sent to the FCCs 205. The cyclic roll trim assembly 229A, the cyclic pitch trim assembly 229B, and the collective trim assembly 225 may include, among other items, measurement devices for measuring the position of the collective sticks 233 and/or the different movement axes of the cyclic sticks 231. Trim motors in each of the cyclic roll trim assembly 229A, the cyclic pitch trim assembly 229B, and the collective trim assembly 225 may drive or set the positions of the cyclic control assembly 217 and/or collective control assembly 219.

The cyclic roll trim assembly 229A, the cyclic pitch trim assembly 229B, and the collective trim assembly 225 may be components of the FBW flight control system 201, and measurements from the cyclic roll trim assembly 229A, the cyclic pitch trim assembly 229B, and the collective trim assembly 225 may be sent to the FCCs 205 operable to instruct flight control devices to execute commands measured through the cyclic roll trim assembly 229A, the cyclic pitch trim assembly 229B, and the collective trim assembly 225. For example, the FCCs 205 may be in communication with actuators and/or other devices operable to change positions of the main rotor blades 105, and the FCCs 205 may generate cyclic control commands and/or collective control commands which are sent to the swashplate 107 and/or other control systems to control the angles of attack of the main rotor blades 105.

FIG. 4C is a diagram illustrating the collective control assembly 219 and range of motion according to some embodiments. In some embodiments, the collective stick 233 is mounted on a collective stick support 453, and moves in an arc to indicate the collective position. In the FBW flight control system 201, the collective stick 233 may be decoupled from the swashplate 107 and/or engines 115, so that the range of motion of the collective stick 233 is not limited by the connection to the swashplate 107 and/or engines 115. The collective control assembly 219 may monitor and determine the position of the collective stick 233, and the FCCs 205 may determine a collective setting according to the position of the collective stick 233. In order to maintain the main rotor speed at a substantially constant RPM, the collective setting may be tied to the engine settings so that the engines 115 provide sufficient power to maintain the rotor speed.

The collective stick 233 may have a low position 443 and a high position 445 that are respectively associated with a lowest collective setting and a maximum normal collective setting for the main rotor blades 105. The low position 443 and the high position 445 may define or bound a normal operating range 441. In some embodiments, the normal operating range 441 includes collective settings that correspond to power settings below a threshold, such as maximum continuous power. The collective stick 233 may also have a maximum position 449 associated with a collective setting corresponding to a maximum settable power. An overdrive range 447 may be defined or bounded by the maximum position 449 and the high position 445, and may include collective settings corresponding to power settings higher than the normal operating range. In some embodiments, the overdrive range 447 includes maximum takeoff power, two minute maximum power, and thirty second maximum power settings. The low position 443, the high position 445 and the maximum position 449 may be stops or positions that are enforced or created by the collective control assembly 219 using tactile cues.

In some embodiments, the collective trim assembly 225 may provide the tactile cues by driving the collective stick 233 or controlling the action, feel, or handling of the collective stick 233 by providing the friction cue in a tactile cue range 451. In some embodiments, the tactile cue range 451 is within the normal operating range 441 and/or the overdrive range 447 and, for movement-type cues such as a force cue, may be in any direction of movement. In some embodiments, the tactile cue range 451 may be limited to the overdrive range 447, the normal operating range 441, or a subset or portion of one or both of the overdrive range 447 and normal operating range 441.

Figure 5:
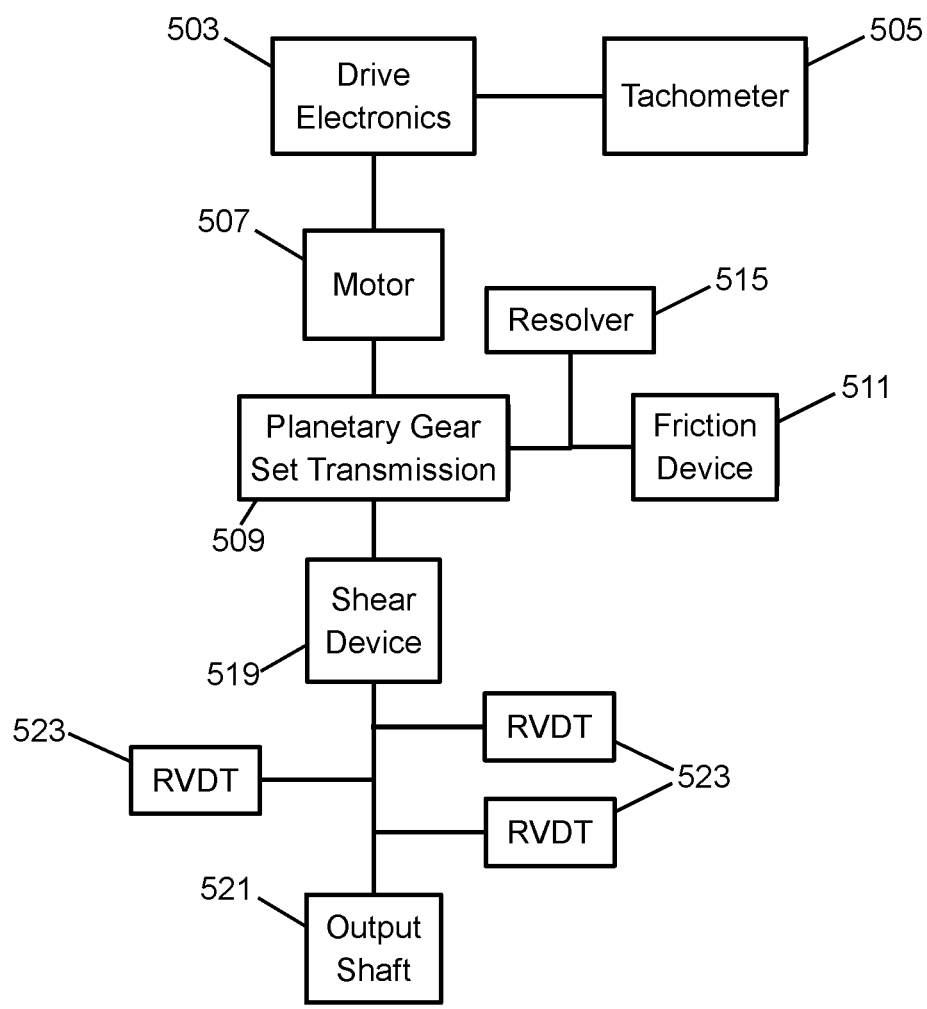
FIG. 5 illustrates a trim assembly with a planetary gear set transmission according to some embodiments.

FIG. 5 is a diagram illustrating a trim assembly 501 with a planetary gear set transmission 509 according to some embodiments. In some embodiments, the trim assembly 501 includes a motor 507 controlled by drive electronics 503, which determine the RPM of the motor 507 using a tachometer 505. The motor 507 is connected to the planetary gear set transmission 509, which is connected to a shear device 519. One or more RVDTs 523 are disposed between the shear device 519 and an output shaft 521 and measure the position of the output shaft 521. The output shaft 521 may be coupled to a control stick (e.g., a cyclic stick 231 or a collective stick 233), and both provides movement to the control stick and receives movement from the control stick.

The trim assembly 501 includes one or more tactile cue elements that provide the tactile cues to the control stick. The tactile cue elements may include the motor 507 and one or more friction devices 511 controlled by drive electronics 503. The tactile cue elements control action of the control stick to provide tactile cues through the motion, feel, resistance, and the like, to the control stick. The drive electronics 503 may receive, from the FCCs 205, or from another element in the FBW flight control system 201, a signal indicating how the tactile cue elements should perform in order to control the action or movement of the control stick.

The motor 507 is connected to the planetary gear set transmission 509, which is connected to the output shaft 521 through the shear device 519. The motor 507 provides a drive force, which may be similar to a spring force, to the control stick. This drive force may mimic the feel of a mechanical spring, while the control stick is mechanically disconnected from the swashplate 107 and the engines 115. Additionally, the friction devices 511 provide resistance to movement of the output shaft 521 and the control stick, which also mimic the feel of a mechanical system.

In some embodiments, the friction devices 511 are electromechanical devices that resist motion of the control stick through gearing in the planetary gear set transmission 509 according to a current passed through the friction devices 511. The planetary gear set transmission 509 is a variable coupling that permits the motor 507 to drive the output shaft 521, while allowing inputs provided by the pilot to the control stick through the output shaft 521 to override the drive force provided by the motor 507. Thus, if the control stick is moved or controlled by the pilot in a way that is contrary to the drive force provided by the motor 507, the pilot's inputs overcome the drive force applied by the motor 507. Additionally, inputs from the control stick through the output shaft 521 drive the planetary gear set transmission 509 and the friction devices 511 so that friction created by the friction devices 511 is felt by the pilot when the pilot moves the control stick.

One or more resolvers 515 may be connected between the planetary gear set transmission 509 and the friction devices 511. The resolvers 515 may act as detent sensors to determine fine motion of the control stick indicating whether the pilot is controlling the control stick. The resolvers 515 may provide detent signals indicating control or motion of the control stick provided by the pilot. The resolvers 515 may be disposed on a secondary output shaft of the planetary gear set transmission 509 separate from the driveline between the motor 507 and the output shaft 521. As such, the resolvers 515 detect movement of the control stick created by the pilot, without interference or input from the motor 507. In some embodiments, the movement of the control stick created by the pilot may be determined as a slip rate. Thus, the resolvers 515 may generate the detent signal indicating a pilot input or the slip rate. The resolvers 515 are used to determine the detent state of the control system in the trim assembly 501 and are an example of detent sensors.

The shear device 519 is a coupling allowing the control stick to be separated from the planetary gear set transmission 509 and the motor 507. For example, should the planetary gear set transmission 509 become jammed, or the motor 507 malfunction, the shear device 519 can be broken so that the control stick may be moved and used without being impeded by the inoperable planetary gear set transmission 509 or the motor 507.

In some embodiments, position sensors, such as rotary variable differential transformers (RVDTs) 523 determine the rotation of the output shaft 521 and generate position signals indicating the position of the control stick. The RVDTs 523 are disposed between the shear device 519 and the output shaft 521 so that the position of the output shaft 521 can be determined even if the shear device 519 has been broken or sheared. This allows the pilot to control the rotorcraft 101, even when the motor 507, the planetary gear set transmission 509, or other parts of the trim assembly 501 are inoperable. In some embodiments, multiple RVDTs 523 are used to separately measure the position of the output shaft 521 for redundancy. Each of the FCCs 205 may be connected to a different RVDT 523 so that each of the FCCs 205 independently determines a positon of the output shaft 521. Any disagreement between readings from the RVDTs 523 can be identified and handled by the FCCs 205. Additionally, the RVDTs 523 are separate from the resolvers 515. This allows the RVDTs 523 to determine the position of the control stick, while the resolvers 515 determine the magnitude of inputs from the pilot through the control stick.

Figure 6:
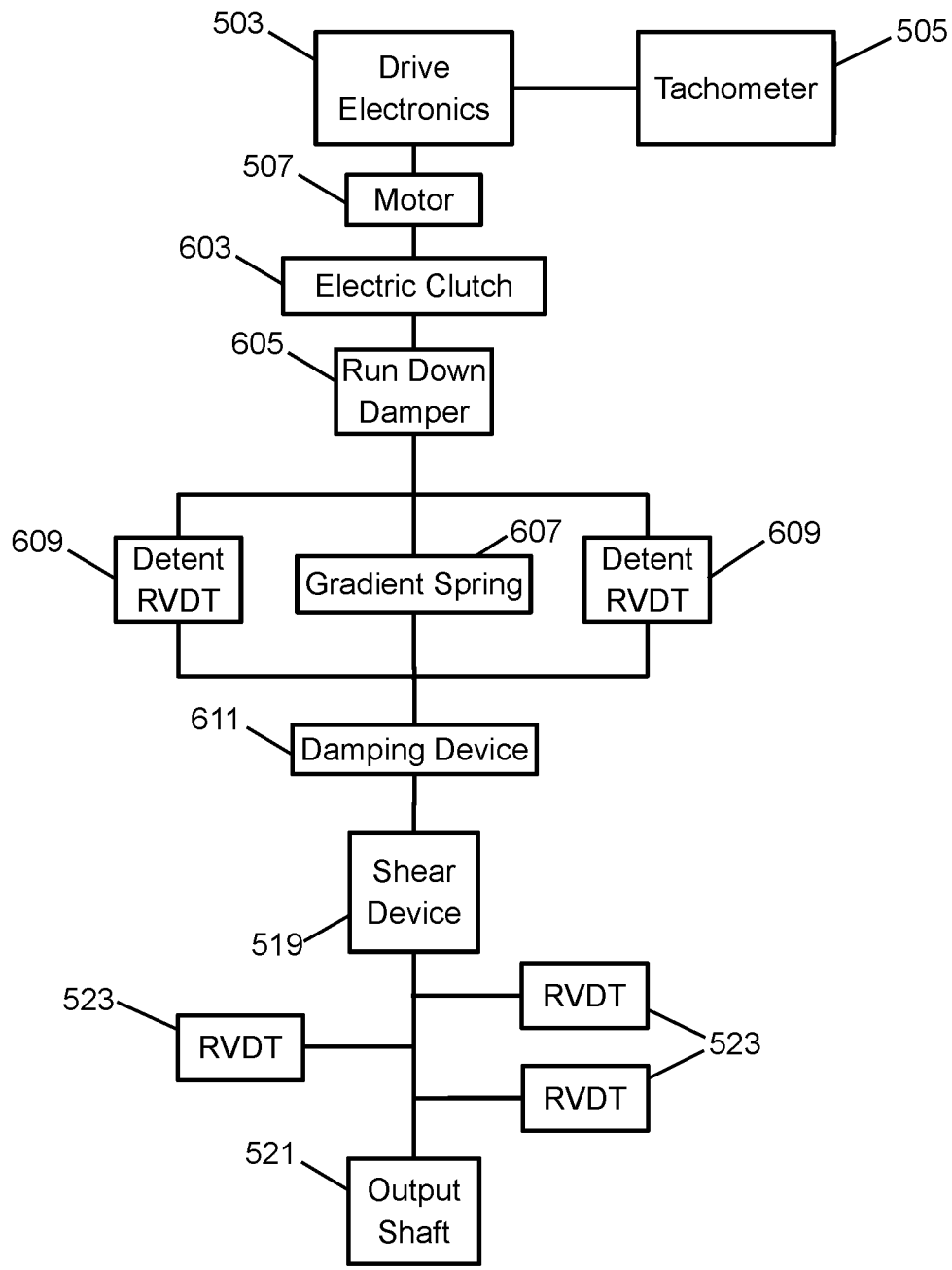
FIG. 6 illustrates a trim assembly with a gradient spring according to some embodiments.

FIG. 6 is a diagram illustrating a trim assembly 601 with a gradient spring 607 according to some embodiments. In some embodiments, the trim assembly 601 includes a motor 507 controlled by drive electronics 503. The drive electronics 503 determine the RPM of the motor 507 using a tachometer 505. The motor 507 is connected to an electric clutch 603 and a run down damper 605. The gradient spring 607 and a damping device 611 are disposed between the run down damper 605 and a shear device 519. One or more RVDTs 523 are disposed between the damping device 611 and an output shaft 521. The RVDTs 523 measure the position of the output shaft 521. One or more detent RVDTs 609 are disposed between the run down damper 605 and the gradient spring 607 and between the gradient spring 607 and the damping device 611. The run down damper 605 and the damping device 611 may provide damping of vibrations and the like transmitted to the control stick by the motor 507 or transmitted by the control stick through the output shaft 521 to the detent RVDTs 609.

The motor 507 drives the output shaft 521 through the gradient spring 607. The motor 507 may be connected and disconnected from the output shaft 521 by the electric clutch 603. The gradient spring 607 compresses when the position of the motor 507 and output shaft 521 are different, indicating that the pilot has overridden the position of the motor 507. For example, when the FCCs 205 drive the motor 507 and the pilot has control of the control stick, the motor 507 winds the gradient spring 607. Alternatively, when the pilot moves the control stick and the motor 507 remains in a particular position, the movement of the control stick winds the gradient spring 607.

The detent RVDTs 609 determine the difference in the position of the motor 507 and the position of output shaft 521 and generate detent signals indicating the difference in the motor and the output shaft positions. The detent RVDTs 609 are wrapped around the gradient spring 607 such that the detent RVDTs 609 generate and send a detent signal to the FCCs 205 any time there is a deflection of the gradient spring 607.

In some embodiments, the gradient spring 607 may be a torsion spring. The detent RVDTs 609 may generate a voltage that varies according to the deflection of the gradient spring 607 and that reflects the relationship of the position of the motor 507 and the position of output shaft 521. The detent RVDTs 609 measure the deflection of the gradient spring 607, rather than separately measuring the position of the motor 507, the position of the output shaft 521, and comparing the difference in these positions. Thus, the detent RVDTs 609 may reduce the number of required RVDTs and the latency required to determine the slip rate or detent state of the control stick by avoiding multiple position measurements and a comparison of various positions. The voltage generated by the detent RVDTs 609 may be interpreted in the detent RVDTs 609 or in the FCCs 205 as the slip rate, which indicates the degree of rotation of the output shaft 521 relative to the motor 507. In some embodiments, multiple detent RVDTs 609 may be provided for redundancy. The FCCs 205 or an alternative redundancy manager may compare the detent signals from each of the detent RVDTs 609 and make a determination how the multiple signals are interpreted. The detent RVDTs 609 are used to determine the detent state of the control system in the trim assembly 601 and are an example of detent sensors.

In some embodiments, the gradient spring 607 may be released such that the gradient spring 607 is not compressed by differences in the position of the motor 507 and the output shaft 521. The gradient spring 607 may be released in response to a gradient spring release signal received by the drive electronics 503 or received directly at an assembly housing the gradient spring 607. The gradient spring release signal may be a signal initiated by the pilot, such as by pressing a button (e.g., a force trim release (IFTR) button). When the gradient spring 607 is released, the detent RVDTs 609 may move with the gradient spring 607 without measuring the tension of the gradient spring 607. In some embodiments, the electric clutch 603 may release or engage the gradient spring 607 according to the gradient spring release signal. This allows the pilot to release the gradient spring 607 and decouple the output shaft 521 and the control stick from a force or tactile cue provided by the motor 507 so that the pilot does not feel the force or pressure created by the gradient spring 607. In some embodiments, the electric clutch 603 may act as a ground part for the gradient spring 607, so that when the electric clutch 603 is released, the gradient spring 607 is also released.

Figure 7:
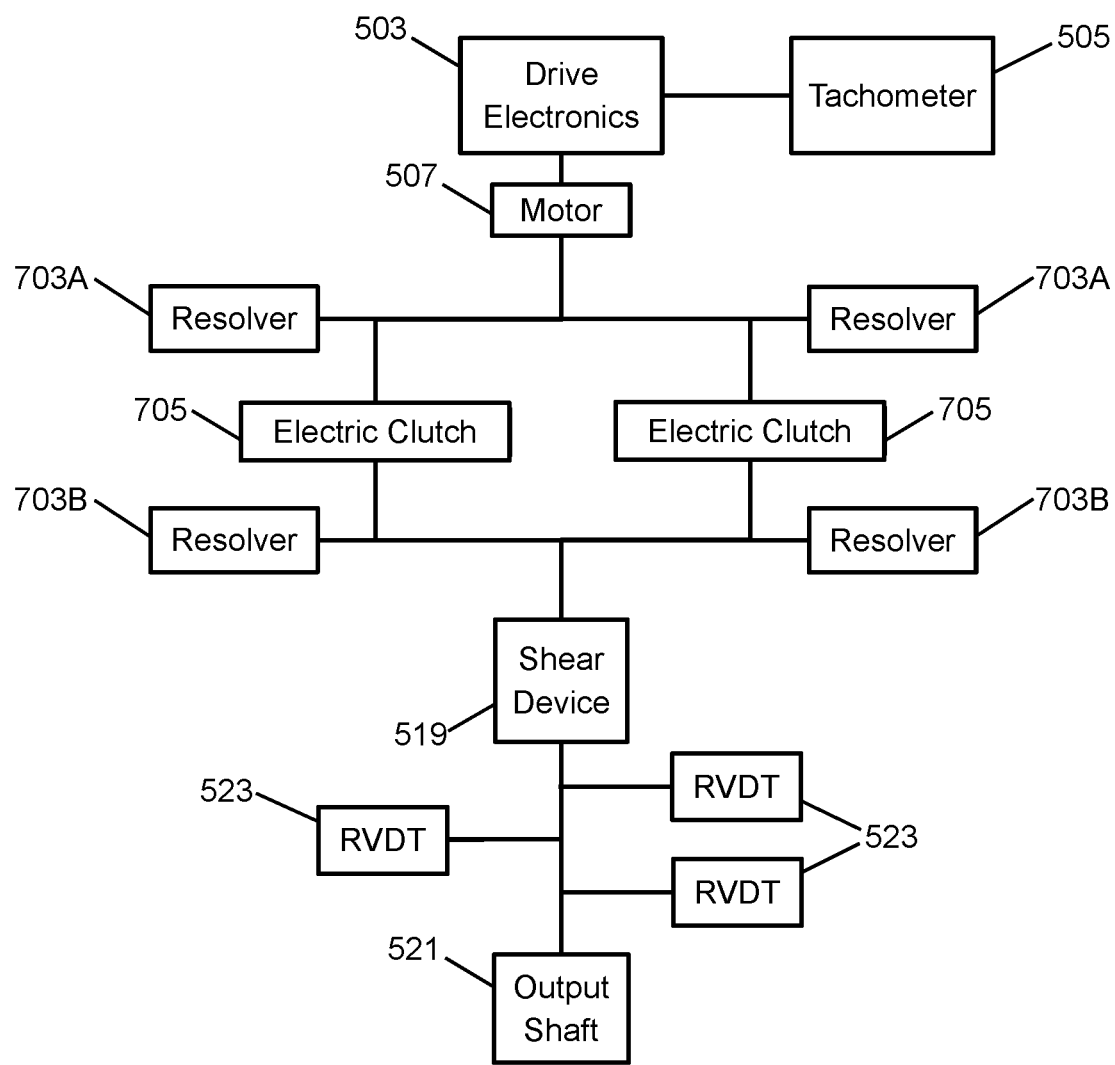
FIG. 7 illustrates a trim assembly with an electric clutch transmission according to some embodiments.

FIG. 7 is a diagram illustrating a trim assembly 701 with an electric clutch transmission 705 according to some embodiments. In some embodiments, the trim assembly 701 includes a motor 507 controlled by drive electronics 503. The drive electronics 503 determine the RPM of the motor 507 using a tachometer 505. The motor 507 is connected to one or more electric clutches 705 and a shear device 519. One or more RVDTs 523 are disposed between the shear device 519 and the output shaft 521 to measure the position of the output shaft 521. The electric clutches 705 connect or disconnect the motor 507 and the output shaft 521 in response to a signal (e.g., an IFTR signal), a command (e.g., from the FCCs 205 or the drive electronics 503), or the like. When the electric clutches 705 are engaged to connect the motor 507 to the output shaft 521, the electric clutches 705 provide a flexible or slippable connection, which allows for pilot inputs to the control stick through the output shaft 521 to override the positioning provided by the motor 507. In some embodiments, multiple electric clutches 705 may be disposed between the motor 507 and the output shaft 521 for redundancy.

First resolvers 703A are disposed at the motor side of the electric clutches 705 and second resolvers 703B are disposed at the output side of the electric clutches 705. The first resolvers 703A and the second resolvers 703B may be collectively referred to as resolvers 703. The first resolvers 703A determine the position of the motor 507 and generate a motor position signal. The second resolvers 703B determine the position of the output shaft 521 and generate an output shaft position signal. The resolvers 703 send the position signals to the drive electronics 503, the FCCs 205, and/or other elements, which determine the slip rate by comparing the motor position signal to the output shaft position signal. Thus, the resolvers 703 may generate the detent signal indicating a pilot input or slip rate. In some embodiments, the trim assembly 701 may include multiple first resolvers 703A and multiple second resolvers 703B. Each of the electric clutches 705 may be in communication with a particular FCC 205, and may include separate sets of the resolvers 703 for redundancy. The resolvers 703 are used to determine the detent state of the control system in the trim assembly 701 and are an example of detent sensors.

In any of the trim assemblies 501, 601, and 701, the detent sensors may include one or more RVDTs. The detent sensors may be duplex RVDTs, which provide dual measurement channels. The detent sensors may have failure rates greater than $10^{-9}$. Failure mode effects and criticality analysis (FMECA) for rotorcraft may require additional action to reduce or mitigate impacts that may be caused by faulty detent sensors in the trim assemblies. For example, detent monitors may be provided in order to detect faulty detent sensors and to turn off flight modes reliant on the fault detent sensors. The detent monitors may detect otherwise undetected failures in the detent sensors. The undetected failures may be defined as instances in which the detent sensor reports that the detent sensor is healthy, but fails to indicate that a pilot has taken control of a control stick (e.g. the control stick is out-of-detent). A detected failure, which may be detected by the detent sensor itself, may be defined as instances in which the detent sensor reports as being faulty, such as in the cases of a short circuit, an open circuit, a cross-channel mismatch, or the like. The detent monitors may be specifically targeted at preventing undetected failures in the detent sensors. In some embodiments, the detent monitors may be referred to as stuck-in-detent (SID) monitors, and may be software included in the FCCs 205 or the like, which monitors the detent sensors. The detent sensors may be hardware components, and may include their own monitors to determine whether the detent sensors are functional (e.g., to detect detected failures).

It should be understood that multiple trim assemblies may be disposed in a particular rotorcraft, and that each trim assembly may be a different type of trim assembly. For example, in some embodiments, a rotorcraft 101 may have a trim assembly 501 with a planetary gear set transmission 509, as shown in FIG. 5, connected to the collective stick, and trim assemblies 601 with gradient springs 607, as shown in FIG. 6, connected to the pitch axis and the roll axis of the cyclic stick. In some embodiments, a rotorcraft 101 may have a trim assembly 701 with one or more electric clutches 705, as shown in FIG. 7, connected to the collective stick and trim assemblies 601 with gradient springs 607 connected to the pitch axis and the roll axis of the cyclic stick.

Figure 8:
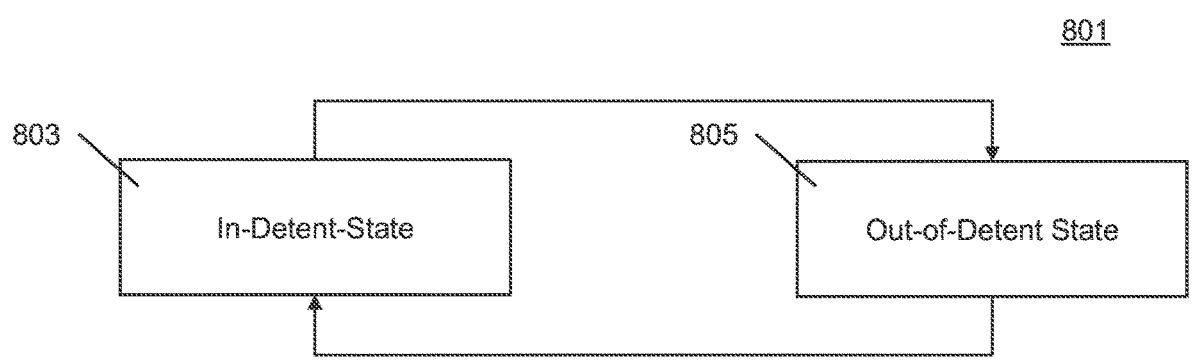
FIG. 8 illustrates a state diagram for determining a detent state of a pilot control according to some embodiments.

FIG. 8 is a state diagram illustrating a detent state machine 801 for determining the detent state of a pilot control according to some embodiments. The detent state machine 801 may be software running on one or more of the FCCs 205, and may be used by the FCCs 205 to determine the state of a particular pilot control, such as a control stick or a control stick axis. The FCCs 205 may track which detent state in the detent state machine 801 is an active detent state, and apply a flight management function based on the active detent state. The detent state machine 801 may have an in-detent state 803 and an out-of-detent state 805, and the FCCs 205 may determine which detent state is the active detent state for a particular pilot control based on movement of the pilot controls, mode selections, pilot trim selections, and the like. The in-detent state 803 (ID) represents the pilot having released control of a particular pilot control, or that the pilot is not overriding motor movement (e.g., a trim rate) of the particular pilot control. The out-of-detent state 805 (OOD) represents the pilot having control of a particular pilot control.

A separate detent state machine 801 may be provided and may run for each pilot control to independently track the detent state of the different pilot controls. In some embodiments, each pilot control may be a control stick, an axis of a control stick, or the like. A collective stick has a single axis of movement such that the collective stick may be a pilot control. The cyclic stick has a pitch axis and a roll axis, which may each be a separate pilot control because the cyclic stick permits movement and control on two axes. A first detent state machine 801 may be associated with the collective stick, a second detent state machine 801 may be associated with the pitch axis of the cyclic stick, and a third detent state machine 801 may be associated with the roll axis of the cyclic stick. The FCCs 205 may use the respective detent state machines 801 to separately determine the detent state of each of the pilot controls, such as the collective stick, the pitch axis of the cyclic stick, and the roll axis of the cyclic stick. In some embodiments, the different cyclic axes are monitored for detent separately, so that a cyclic stick may be in the in-detent state 803 on one axis, while the cyclic stick is in the out-of-detent state 805 on the other axis.

In some embodiments, the FCCs 205 determine whether a particular pilot control is in the in-detent state 803 or the out-of-detent state 805 according trim data. The trim data may be a slip rate of a transmission or a clutch between a motor 507 and an output shaft 521 connected to the particular pilot control. The slip rate may be a rate of change of the particular pilot control, such as a collective control. The trim data may be a distance or a trim delta of the particular pilot control from a commanded trim or a default position. In some embodiments, the commanded trim or the default position may be a position to which the motor 507 is attempting to drive the pilot control; may be a neutral position; or the like. For example, when the motor 507 is not attempting to drive a pilot control, such as a cyclic stick, a default position for each axis of movement on the cyclic stick may correspond to a centered position. When the motor 507 is driving the cyclic stick to, for example, provide course or attitude corrections, provide tactile cues, implement an automated flight maneuver, or the like, a commanded trim for a cyclic axis may be the position to which the motor 507 is attempting to drive the cyclic stick.

In some embodiments, the default position for a collective stick not being driven by the motor 507 may be a low position on the collective stick, a position associated with a hover command or with level flight, or the like. When the motor 507 is driving the collective stick to, for example, provide a tactile cue, provide a vertical speed hold, provide a power hold, or the like, the commanded trim may be the position to which the motor 507 attempts to drive the collective stick. Thus, the trim delta may be the distance by which a pilot has moved a particular pilot control from a position the particular pilot control would be at if the pilot was not controlling or holding the particular pilot control. Using both the slip rate and the trim delta may create a robust detent detection methodology to filter out vibration, and prevent small pilot movements from being interpreted as vibration.

The FCCs 205 may receive detent signals or the like, which indicate or are used to determine, trim data such as the slip rate and the trim delta. In some embodiments, the FCCs 205 use signals or data values indicating the slip rate or the trim delta to determine the active detent state, or whether the active detent state should be changed. In some embodiments, the FCCs 205 may further determine the active detent state based on other settings, such as whether augmentation of the pilot controls is turned off, whether the pilot has activated the FTR (e.g., the switch 322), a flight mode, or the like.

In some embodiments, the active detent state may initially be set to the out-of-detent state 805 upon startup of the FCCs 205, upon initialization of the detent state machine 80*i*, or the like. When the out-of-detent state 805 is the active state, the FCCs 205 may change the active detent state to the in-detent state 803 according to trim data, such as the slip rate and/or the trim delta. One or more trim thresholds may be determined and compared against the trim data. In some embodiments, the FCCs 205 change the active detent state to the in-detent state 803 when the slip rate is less than a trim threshold, such as a slip rate threshold. In some embodiments, the FCCs 205 change the active detent state to the in-detent state 803 when the slip rate is less than the slip rate threshold and the trim delta is less than a trim delta threshold. The slip rate threshold and the trim delta threshold may each be predetermined values; may be selected from a set of predetermined values; may selected according to a flight mode, a flight parameter, or a stick positon, or the like; may be selected according to active or inactive flight management functions; or the like. When the FCCs 205 determine that the trim delta equals or exceeds the trim delta threshold, the FCCs 205 change the active detent state to the out-of-detent state 805.

The FCCs 205 may provide different flight management functions depending on whether each pilot control is determined to be in the in-detent state 803 or the out-of-detent state 805, and based on whether the trim motors and/or detent sensors are determined to be functional or faulty. In some embodiments, a first flight management function is an automated flight function, trim function, tactile cueing function, or any other function provided by the FCCs 205. In some embodiments, the first flight management function is a function such as a vertical speed hold, an automated go-around, a power hold, a flight mode aware handling adjustment function, an automated course or attitude correction, an RPM over-speed protection function, a forward or reverse tactile cueing function, or the like. In some embodiments, the first flight management function may be a basic augmented or un-augmented flight control function, without any additional automated flight functions. In some embodiments, a second flight management function is a rate loop function (e.g., a flight management function in which the inner loop 317 and the rate loop 315 are active and the outer loop 313 is inactive), an augmentation off function (e.g., a flight management function in which the inner loop 317 is active and the outer loop 313 and the rate loop 315 are inactive), or the like. The FCCs 205 may provide the first flight management function when respective pilot controls are in the in-detent state 803 and the trim motors/detent sensors are determined to be functional. The FCCs 205 may provide the second flight management function when the respective pilot controls are in the out-of-detent state 805, or when any of the trim motors and/or detent sensors associated with a particular pilot control are determined to be faulty.

Figure 9:
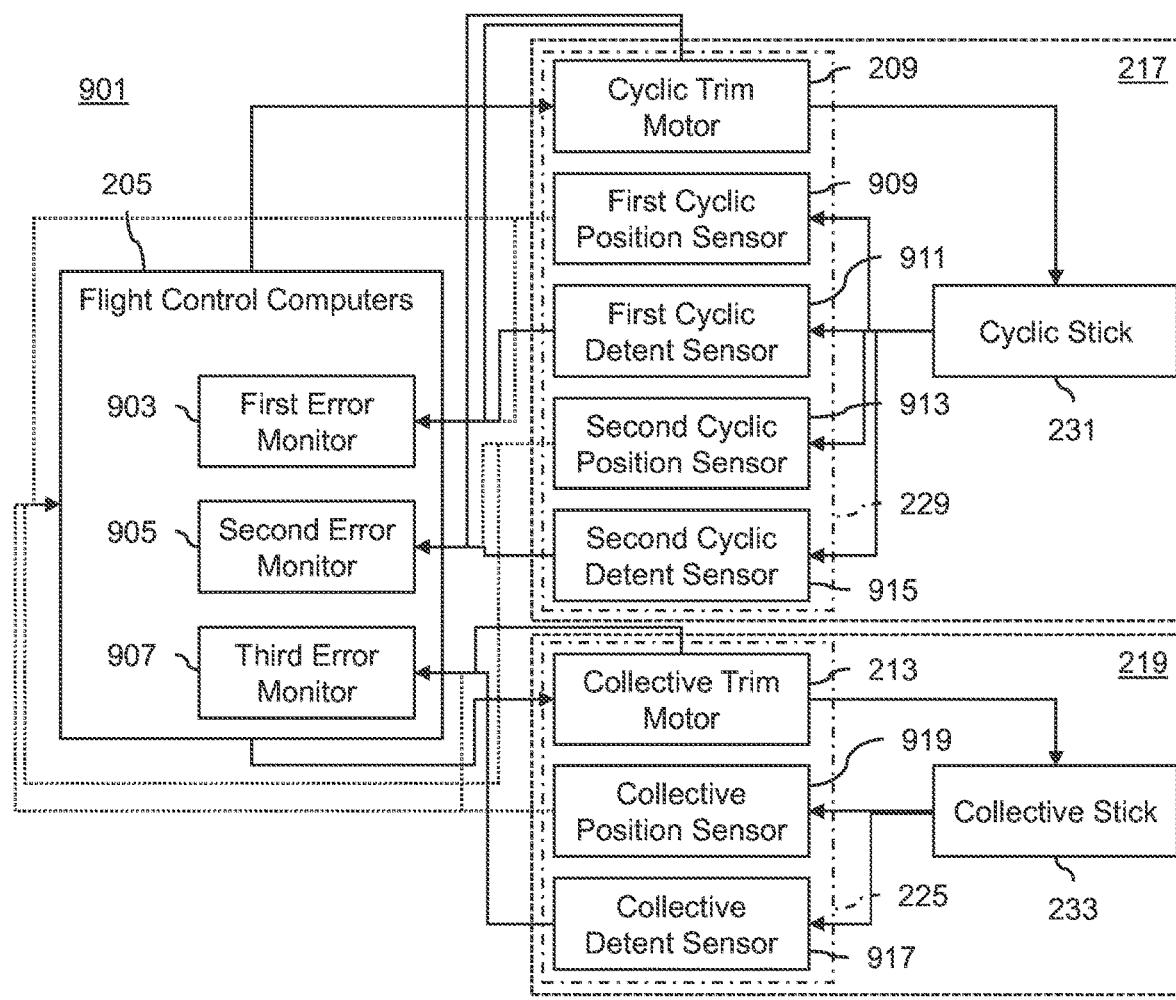
FIG. 9 illustrates a sensor functionality determination system for a rotorcraft according to some embodiments.

FIG. 9 illustrates a sensor functionality determination system 901 for the rotorcraft 101 according to some embodiments. As shown in FIG. 9, the sensor functionality determination system 901 includes flight control computers (FCCs) 205, the cyclic control assembly 217, and the collective control assembly 219. The sensor functionality determination system 901 may be an SID monitor, and may be implemented as software in the FCCs 205. The cyclic control assembly 217 includes the cyclic stick 231 and the cyclic trim assembly 229. The collective control assembly includes the collective stick 233 and the collective trim assembly 225. The cyclic control assembly 217 and the collective control assembly 219 may be any of the trim assemblies 501, the trim assemblies 601, or the trim assemblies 701. In some embodiments, the FCCs 205 include a plurality of error monitors, each of which may be an SID monitor, such as a first error monitor 903, a second error monitor 905, and a third error monitor 907.

In some embodiments, the cyclic trim assembly 229 includes the cyclic trim motor 209, a first cyclic position sensor 909, a first cyclic detent sensor 911, a second cyclic position sensor 913, and a second cyclic detent sensor 915. As discussed above, the cyclic trim motor 209 may drive the cyclic stick 231 to positions suggested by the FCCs 205. In some embodiments, the cyclic trim motor 209 may include a first cyclic trim motor operating along a first axis and a second cyclic trim motor operator along a second axis perpendicular to the first axis.

The first cyclic detent sensor 911 and the second cyclic detent sensor 915 may act in concert to determine whether a pilot is interacting with the cyclic stick 231. In some embodiments, the first cyclic detent sensor 911 and the second cyclic detent sensor 915 may act individually to determine whether a pilot is interacting with the cyclic stick 231 in a first direction along the first axis and a second direction along the second axis, respectively. More specifically, the first cyclic detent sensor 911 and the second cyclic detent sensor 915 may each detect the motion and/or position of the cyclic stick 231 in a different direction that is caused by pilot input along different axes. In some embodiments, the first cyclic detent sensor 911 detects the motion and/or position of the cyclic stick 231 in the first direction along the first axis and the second cyclic detent sensor 915 detects the motion and/or position of the cyclic stick 231 in the second direction along the second axis. The first direction may be the left-right direction and may control the roll of the rotorcraft 101. The second direction may be the fore-aft direction and may control the pitch of the rotorcraft 101. In some embodiments, the cyclic trim assembly 229 may only include one cyclic detent sensor which detects motion and/or the position of the cyclic stick 231 in both the first direction and the second direction. The cyclic trim assembly 229 may include more than two cyclic detent sensors, such as three, four, five, or more cyclic detent sensors. Any of the resolvers 515, the detent RVDTs 609, or the resolvers 703 may be used for the first cyclic detent sensor 911 and the second cyclic detent sensor 915.

The first cyclic position sensor 909 and the second cyclic position sensor 913 detect the position of the cyclic stick 231. The first cyclic position sensor 909 and the second cyclic position sensor 913 detect the position of the cyclic stick 231 in the first direction and the second direction, respectively, and generate roll and pitch signals, respectively, which are sent to the FCCs 205. In some embodiments, the roll signals may be sent from the first cyclic position sensor 909 to the first error monitor 903 and the pitch signals may be sent from the second cyclic position sensor 913 to the second error monitor 905. The FCCs 205 then control the swashplate 107, engines 115, tail rotor 109 or related flight control devices based on the signals received from the first cyclic position sensor 909 and the second cyclic position sensor 913.

The collective trim assembly 225 may include a collective trim motor 213, a collective detent sensor 917, and a collective position sensor 919. As discussed above, the collective trim motor 213 may drive the collective stick 233 to positions suggested by the FCCs 205. The collective detent sensor 917 may be the same as or similar to the collective detent sensor 237 and the collective position sensor 919 may be the same as or similar to the collective position sensor 215. The collective detent sensor 917 may determine whether the pilot is interacting with the collective stick 233. More specifically, the collective detent sensor 917 may detect the motion and/or position of the collective stick 233 that is caused by pilot input. Any of the resolvers 515, the detent RVDTs 609, or the resolvers 703 may be used for the collective detent sensor 917.

The collective position sensor 919 measures the position of the collective stick 233. The collective stick 233 may move along a single axis or with a lever type action. The collective position sensor 919 detects the position of the collective stick 233 and sends a collective position signal to the FCCs 205. In some embodiments, the collective position sensor 919 sends the collective position signal to the third error monitor 907. The FCCs 205 then control the engines 115, swashplate actuators, or related flight control devices according to the collective position signal to control the vertical movement of the rotorcraft.

As illustrated in FIG. 9, the cyclic trim motor 209, the first cyclic detent sensor 911, and the first cyclic position sensor 909 send data signals to the first error monitor 903; the cyclic trim motor 209, the second cyclic detent sensor 915, and the second cyclic position sensor 913 send data signals to the second error monitor 905; and the collective trim motor 213, the collective detent sensor 917, and the collective position sensor 919 send data signals to the third error monitor 907. The first cyclic position sensor 909, the second cyclic position sensor 913, and the collective position sensor 919 send data signals to the FCCs 205. The first cyclic detent sensor 911, the second cyclic detent sensor 915, and the collective detent sensor 917 may be collectively referred to as "detent sensors." The cyclic trim motor 209 and the collective trim motor 213 may be collectively referred to as "trim motors." The first error monitor 903, the second error monitor 905, and the third error monitor 907 may be collectively referred to as "error monitors." The first cyclic position sensor 909, the second cyclic position sensor 913, and the collective position sensor 919 may be collectively referred to as "position sensors."

The detent sensors may send detent data signals to the error monitors, which may include both the slip rate data for each detent sensor and detent state data for each detent sensor. The slip rate data indicates the stick rate, or the change in position of the control element to which the detent sensor is connected over time (e.g., the stick velocity or the control element rate). The detent state data indicates whether the respective control element is in the in-detent state 803 or the out-of-detent state 805. In some embodiments, the detent sensors may only send slip rate data signals or the like, and the error monitors may determine whether the control elements are in the in-detent state 803 or the out-of-detent state 805. The trim motors may send trim rate data signals to the error monitors. The position sensors may send position data signals to the FCCs 205 and the error monitors.

The error monitors are configured to detect whether any of the detent sensors and/or the trim motors are faulty. If the error monitors determine that any of the detent sensors and/or the trim motors are faulty, certain flight modes may be turned off in the FCCs 205. In some embodiments, the flight modes that may be turned off are flight modes that depend on signals from the detent sensors, or that use the trim motors to drive the pilot controls to maintain desired flight characteristics. For example, outer loop flight augmentation may be turned off if the error monitors determine that any of the detent sensors and/or the trim motors are faulty. Different flight modes may be turned off in the FCCs 205 depending on which of the detent sensors and/or the trim motors are determined to be faulty and depending on how many of the detent sensors and/or the trim motors are determined to be faulty. For example, if the collective detent sensor 917 is determined to be faulty, modes that depend on signals from the collective detent sensor 917 may be turned off in the FCCs 205. Examples of modes that depend on such signals include a vertical speed hold function, a hover hold mode, or the like. The same modes may be turned off when the collective trim motor 213 is determined to be faulty. As another example, if either the first cyclic detent sensor 911 or the second cyclic detent sensor 915 is determined to be faulty, modes that depend on signals from the first cyclic detent sensor 911 or the second cyclic detent sensor 915 may be turned off in the FCCs 205. An example of a mode that depends on such signals is a horizontal speed hold function. The same modes may be turned off when the cyclic trim motor 209 is determined to be faulty.

In some embodiments, the first error monitor 903, the second error monitor 905, and the third error monitor 907 may comprise persistence monitors. In embodiments in which the error monitors comprise persistence monitors, an error monitor may increase a count each time an error is detected in a trim motor or a detent sensor. The error monitor may decrease the count each time the trim motor or the detent sensor is found to be functioning properly. The error monitor may determine that a detent sensor or a trim motor is faulty if the count exceeds a threshold value. The threshold value may be, for example, one, five, thirteen, fifteen, twenty, or any other value.

For the trim motors, the error monitors may detect an error each time the detent sensors reflect that a pilot control is in the in-detent state 803 and the trim motor is moving the pilot control in a direction different from a direction commanded by the FCCs 205. This may be determined by comparing the detent slip rate data (e.g., the control element rate data or stick rate data), the trim command data from the FCCs 205, and the detent state data from the respective detent sensor. Specifically, a trim motor errors is detected when the detent slip rate data and the trim command data are not in agreement (e.g., are of a different magnitude from one another or are in opposite directions).

For the detent sensors, the error monitors may detect an error each time the detent sensors reflect that a pilot control is in the in-detent state 803 and the pilot control is moving in a direction different from a direction in which the trim motor is attempting to move the pilot control. This may be determined by comparing the trim rate signal from the trim motor, the detent slip rate data (e.g., the control element rate data or stick rate data), and the detent state data from the respective detent sensor. In some embodiments, the errors in the detent sensors may be determined by comparing the detent slip rate data (e.g., the control element rate data or stick rate data), the trim command data from the FCCs 205, and the detent state data from the respective detent sensor. Specifically, a detent sensor error is detected when the trim rate data (or the trim command data) and the detent slip rata are not in agreement (e.g., are of a different magnitude from one another or are in opposite directions).

Errors in both the detent sensors and the trim motors may be detected based on the same data. For example, the error monitors may detect an error in the detent sensors or the trim motors when the detent slip rate data is not in agreement with the trim command data, and the detent state data reflects that a pilot control is in the in-detent state 803. Additional monitors, such as trim motor monitors and the like may be used to determine whether the errors are a result faulty detent sensors or faulty trim motors.

In some embodiments, the error monitor may be configured to not decrease the count or to maintain the count when the trim motor or the detent sensor is found to be functioning properly. The error monitor may be another type of error monitor, such as an accumulator-type error monitor, a self-tuning threshold monitor, a static threshold monitor, a discrete error monitor, or the like.

In some embodiments, the FCCs 205 operate on data discretely using frames. Thus, the FCCs 205 may receive data in regularly timed frames, and operate on the data in the frames. In some embodiments, the FCCs 205 receive fifty data frames per second, although other (e.g., higher) framerates could be used based on the capabilities of the FCCs 205. The FCCs 205 continuously monitor incoming data frames to determine whether the trim rate data from the trim motors, the trim command data from the FCC 205, the detent slip rate data (e.g., the control element/stick rate data) from the detent sensors, and the detent state data from the detent sensors are in agreement with one another, or whether errors have occurred in the trim motors and/or the detent sensors. Based on this data, the error monitors of the FCCs 205 determine and detect whether the trim motors and/or the detent sensors are faulty. The FCCs 205 may increase, decrease, or maintain the count based on the data in each of the frames.

The error monitors may be latched. For example, in some embodiments, a detection of a faulty detent sensor or a faulty trim motor by the error monitors is not resettable while the rotorcraft 101 is in flight. As such, flight modes in the FCCs 205 that depend on signals from the detent sensors or movement of the pilot controls by the trim motors may be turned off until the rotorcraft 101 has landed, the detent sensors and/or trim motors are repaired or replaced, and the error monitors are reset. In some embodiments, the error monitors may be resettable while the rotorcraft is in flight. In some embodiments, a warning may be displayed on a pilot's monitor if any of the detent sensors and/or trim motors are determined to be faulty.

Figure 10A:
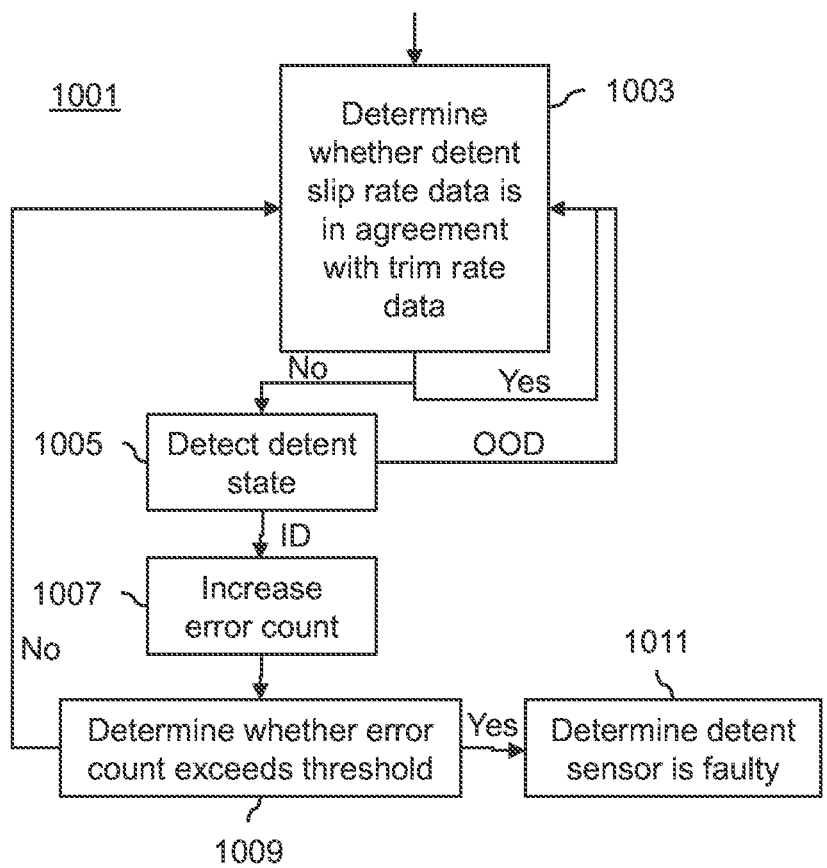
FIG. 10A illustrates a flow diagram of a method for determining whether a detent sensor in a rotorcraft is faulty according to some embodiments.
Figure 10B:
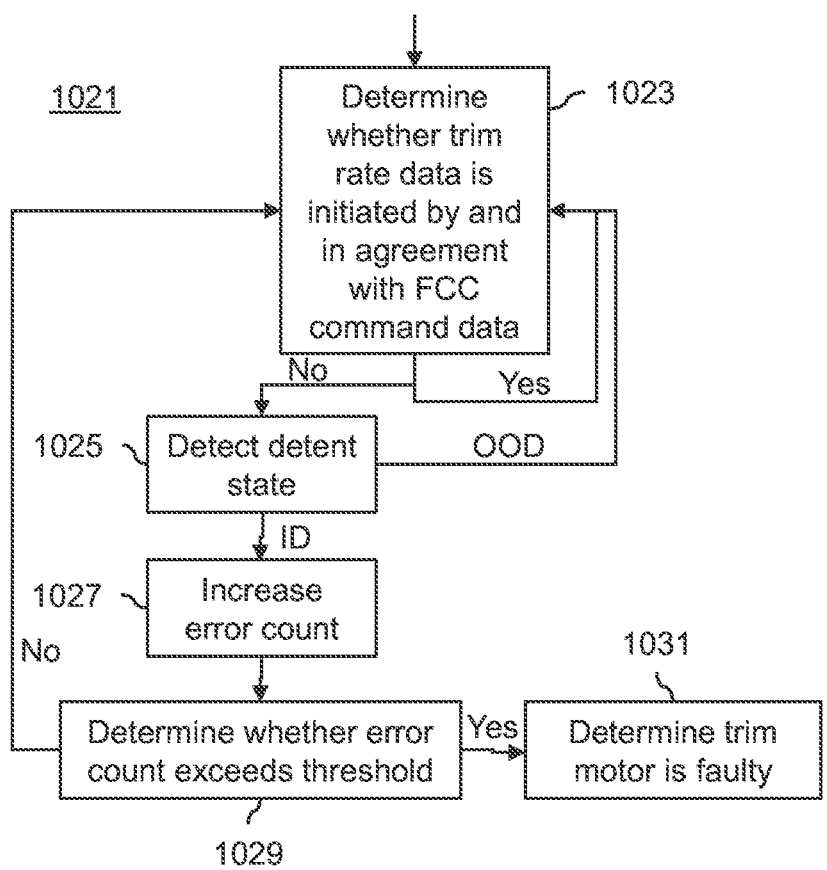
FIG. 10B illustrates a flow diagram of a method for determining whether a trim motor in a rotorcraft is faulty according to some embodiments.

FIGS. 10A and 10B illustrate a flow diagram of a method 1001 for determining whether a detent sensor in the rotorcraft 101 is faulty and a method 1021 for determining whether a trim motor in the rotorcraft 101 is faulty according to some embodiments. In block 1003 of the method 1001, the FCCs 205 determine whether detent slip rate data from the detent sensors is in agreement with trim rate data from the trim motors. If the FCCs 205 determine that the detent slip rate data is in agreement with the trim rate data, block 1003 is repeated. If the FCCs 205 determine that the detent slip rate data is in conflict with the trim rate data, such as being in a direction opposite to a direction indicated by the trim rate data, the method 1001 proceeds to block 1005.

In block 1005, the FCCs 205 determine whether the detent sensors indicate the relevant pilot control is in the in-detent state 803 (ID) or the out-of-detent state 805 (OOD). If the pilot control is OOD, block 1003 is repeated. If the pilot control is ID, the FCCs 205 determine that there is an error in the detent sensors, and the FCCs 205 increase an error count in the relevant error monitor in block 1007. In block 1009, the FCCs 205 determine whether the error count in the error monitor exceeds a threshold value. If the error count does not exceed the threshold value, the method 1001 returns to and repeats block 1003. If the error count exceeds the threshold value, the method 1001 proceeds to block 1011 and the error monitor determines that the detent sensor is faulty. When the detent sensor is determined to be faulty, certain flight modes are turned off, as discussed above. For example, the rotorcraft 101 may proceed to operate in a second flight mode (providing second flight management functions) where flight commands or augmentation provided by the rate loop 315 and/or the outer loop 313 may be turned off or disable.

In block 1023 of the method 1021, the FCCs 205 determine whether trim rate data from the trim motors is initiated by and in agreement with trim command data from the FCCs 205. If the FCCs 205 determine that the trim rate data is in agreement with and has been initiated by the trim command data, block 1023 is repeated. If the FCCs 205 determine that the trim rate data is not initiated by and is in conflict with the trim command data, such as being in a direction opposite to a direction initiated by the trim command data, the method 1021 proceeds to block 1025. In some embodiments, the FCCs 205 compare the trim command data from the FCCs 205 with detent slip rate data from the detent sensors to detect errors in the trim motors.

In block 1025, the FCCs 205 determine whether the detent sensors indicate the relevant pilot control is in the in-detent state 803 (ID) or the out-of-detent state 805 (OOD). If the pilot control is OOD, block 1023 is repeated. If the pilot control is ID, the FCCs 205 determine that there is an error in the trim motors, and the FCCs 205 increase an error count in the relevant error monitor in block 1027. In block 1029, the FCCs 205 determine whether the error count in the error monitor exceeds a threshold value. If the error count does not exceed the threshold value, the method 1021 returns to and repeats block 1023. If the error count exceeds the threshold value, the method 1021 proceeds to block 1031 and the error monitor determines that the trim motor is faulty. When the trim motor is determined to be faulty, certain flight modes are turned off, as discussed above. For example, the rotorcraft 101 may proceed to operate in a second flight mode (providing second flight management functions) where flight commands or augmentation provided by the rate loop 315 and/or the outer loop 313 may be turned off or disabled.

Figure 11:
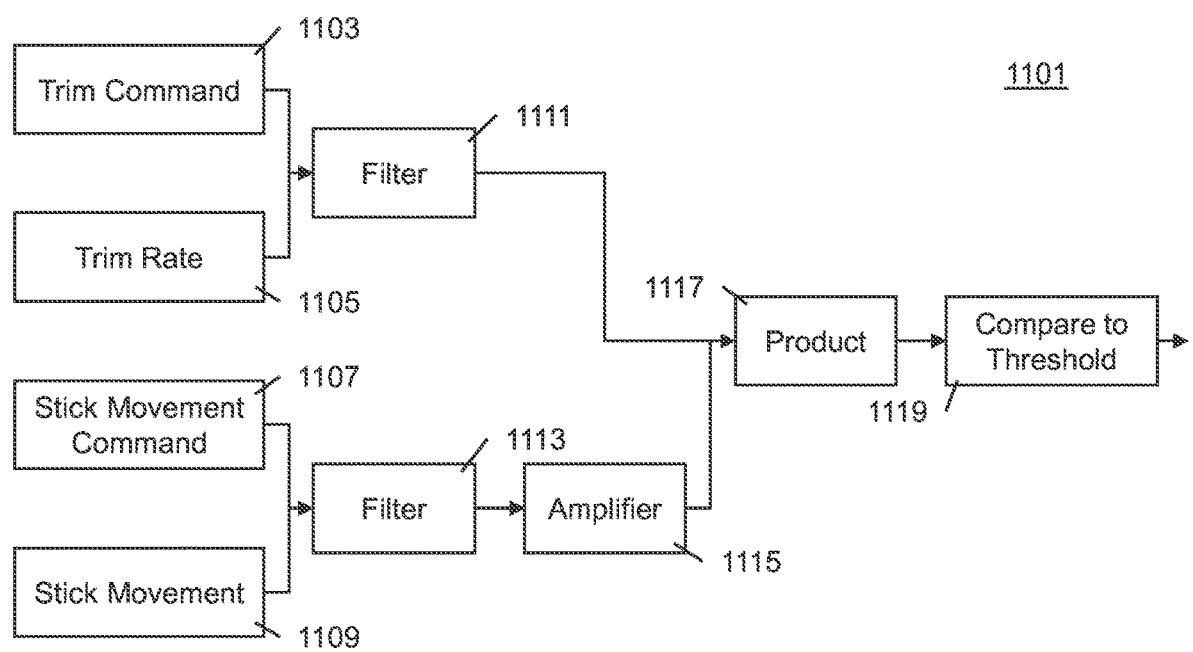
FIG. 11 illustrates a flow diagram of a method for determining whether a detent sensor or a trim motor in a rotorcraft is faulty according to some embodiments.
Figure 12:
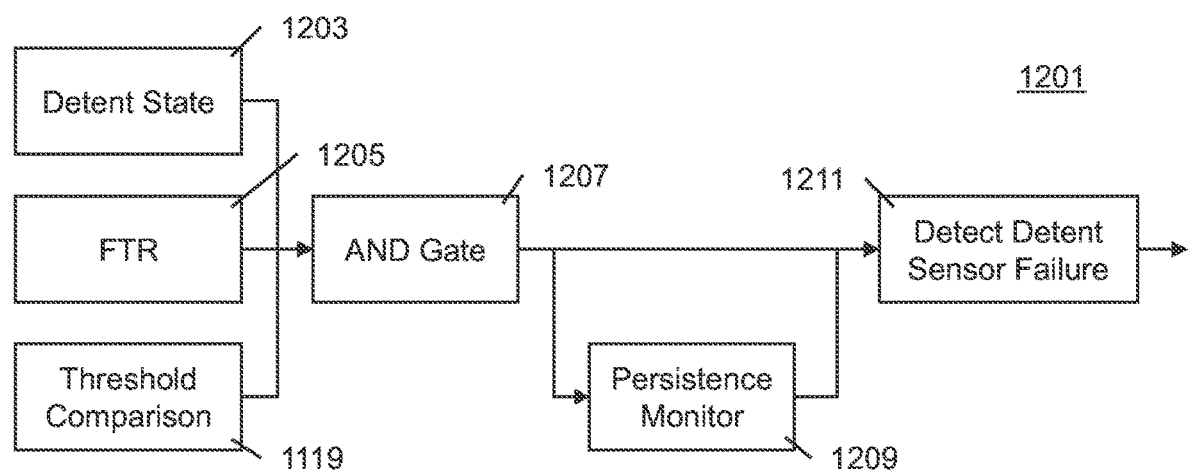
FIG. 12 illustrates a flow diagram of a method for determining whether a detent sensor or a trim motor in a rotorcraft is faulty according to some embodiments.

FIGS. 11 and 12 illustrate logic for monitoring whether a failure has occurred in a detent sensor or a trim motor. FIG. 11 is a flow diagram illustrating a method 1101 for determining whether stick movement data (e.g., detent data) and trim data are in agreement with one another. FIG. 12 is a flow diagram illustrating a method 1201 for determining whether a failure has occurred in the detent sensor or the trim motor. In some embodiments, the methods 1101 and 1201 may be separately implemented for a latitudinal axis of the cyclic stick, a longitudinal axis of the cyclic stick, and the collective stick. However, in some embodiments, the methods 1101 and 1201 may be implemented for the latitudinal axis of the cyclic stick in conjunction with the longitudinal axis of the cyclic stick.

In FIG. 11, inputs include data a trim command 1103, a trim rate 1105, a stick movement command 1107, and a stick movement 1109. The trim command 1103 and the stick movement command 1107 for each stick may be the same. When the trim motors and the detent sensors are functioning properly and the stick is in detent, the trim rate 1105 and the stick movement 1109 are in agreement with one another, and with the trim command 1103 and the stick movement command 1107. However, errors in the trim motors or the detent sensors cause disagreements in the trim command 1103, the trim rate 1105, the stick movement command 1107, and the stick movement 1109, which are detected by the error monitors.

The methods of FIGS. 11 and 12 may detect two separate error conditions, each of which results in disagreements between the input data signals (e.g., the trim command 1103, the trim rate 1105, the stick movement command 1107, and the stick movement 1109), despite the detent sensors reporting that the stick is in detent. For example, a runaway trim motor (e.g., an error or failure in a trim motor) or a faulty detent sensor may result in the stick movement 1109 being in a direction opposing the trim rate 1105.

For a runaway trim motor, an issue in a trim motor causes the trim motor to move the stick without the trim motor being commanded by the trim command 1103. As such, the stick movement 1109 and the trim rate 1105 are in a direction opposite the trim command 1103 and the stick movement command 1107. The stick movement 1109 is detected and the trim command 1103 and the stick movement command 1107 are increased in a direction opposite the trim rate 1105 and the stick movement 1109 to attempt to counteract the runaway trim motor. The trim command 1103 and the stick movement command 1107 may be capped when an integrator is saturated. Increasing the trim command 1103 and the stick movement command 1107 causes an error condition, which may cause a noticeable transient condition when a pilot engages the FTR switch, or when the pilot takes control of the stick. This may cause the rotorcraft to jump or move unexpectedly when the pilot engages the FTR switch or takes control of the stick. As such, certain flight modes may be turned off in order to prevent commands from building up in the trim command 1103 and the stick movement command 1107 and to prevent the noticeable transient condition from occurring as a result of the runaway trim motor. Further, the runaway trim motor may be detected and disabled.

For a faulty detent sensor, an issue in a detent sensor causes the detent sensor to report that a stick is in detent, when the stick is actually out of detent. As an example, the pilot moves the stick such that the stick movement 1109 is in a first direction. The trim command 1103 and the stick movement command 1107 oppose the stick movement 1109 such that the trim rate 1105 is in a second direction opposite the first direction. The stick movement 1109 is detected and the trim command 1103 and the stick movement command 1107 are increased in the second direction opposite the first direction of the stick movement to attempt to counteract the stick movement 1109. The trim command 1103 and the stick movement command 1107 may be capped when an integrator is saturated. Increasing the trim command 1103 and the stick movement command 1107 causes an error condition, which may cause a noticeable transient condition when a pilot engages the FTR switch, or when the pilot takes control of the stick. This may cause the rotorcraft to jump or move unexpectedly when the pilot engages the FTR switch or takes control of the stick. As such, certain flight modes may be turned off in order to prevent commands from building up in the trim command 1103 and the stick movement command 1107 and to prevent the noticeable transient condition from occurring as a result of the faulty detent sensor. Further, the faulty detent sensor may be detected and disabled.

In FIG. 11, the trim command 1103 and the trim rate 1105 are passed through a first filter 1111, and the stick movement command 1107 and the stick movement 1109 are passed through a second filter 1113. The first filter 1111 may be a lag filter or the like, and the second filter 1113 may be a washout filter or the like. The signal from the second filter 1113 may be sent to an amplifier 1115. A product of the signal from the first filter 1111 and the signal from the amplifier 1115 is calculated in block 1117, and is compared to a threshold value in block 1119. The product in block 1117 may be negative when any of the trim command 1103, the trim rate 1105, the stick movement command 1107, and the stick movement 1109 are not in agreement with one another. For example, the product in block 1117 may be negative when the trim command 1103 and the trim rate 1105 are in opposition (e.g., when a runaway trim motor condition exists), when the trim rate 1105 and the stick movement 1109 are in opposition (e.g., when a faulty detent sensor condition exists), or the like. In some embodiments, any disagreement within the trim command 1103, the trim rate 1105, the stick movement command 1107, and the stick movement 1109 may be sufficient to meet the threshold value in block 1119. In some embodiments, the disagreement within the trim command 1103, the trim rate 1105, the stick movement command 1107, and the stick movement 1109 must be sufficiently large in order to meet the threshold value in block 1119.

In FIG. 12, a detent state signal 1203, an FTR signal 1205, and the result of the threshold comparison in block 1119 are sent to an AND gate 1207. The detent state signal 1203 indicates the detent state detected by the detent monitors. The IFTR signal 1205 indicates whether the IFTR button has been pressed. When the stick is out of detent, it is expected that the stick movement 1109 will not be in agreement with the trim rate 1105 because the pilot is in control of the stick. Therefore, when the detent state signal 1203 indicates the stick is out of detent, no error is reported by the AND gate 1207 regardless of the threshold comparison of block 1119. When the detent state signal 1203 indicates the stick is in detent, but the threshold comparison in block 1119 is not met, no error is reported by the AND gate 1207. When the detent state signal 1203 indicates the stick is in detent, and the threshold comparison in block 1119 is met, an error is reported by the AND gate 1207.

The error is sent from the AND gate 1207 to a persistence monitor 1209. The persistence monitor 1209 increases a count each time an error is reported from the AND gate 1207. Once the count reaches a threshold value, the persistence monitor 1209 reports a faulty detent sensor and a detent sensor failure is detected in block 1211. The count in the persistence monitor 1209 may decrease or reset over time if the AND gate 1207 stops reporting errors. In some embodiments, the count in the persistence monitor 1209 may not decrease or reset, and may continue to increase with each error reported by the AND gate 1207.

The FTR signal 1205 indicates whether the FTR (e.g., the switch 322) is engaged. When the FTR is engaged, outer loop flight augmentation is turned off. As such, the trim rate 1105 should be zero. When the FTR signal 1205 indicates that the FTR is not engaged and the trim rate 1105 is non-zero and not initiated by the trim command 1103 or the stick movement command 1107, an error is reported by the AND gate 1207. This indicates that a runaway trim motor condition exists.

The error monitors are used to ensure that the detent sensors and the trim motors are operating correctly and are not faulty. This may prevent a pilot of a rotorcraft from entering larger commands than they intend. For example, if a detent sensor or trim motor is faulty, pilot commands may not be recognized by the FCCs 205 and the pilot may press the FTR button (e.g., the switch 322). If the pilot moved a control stick before pressing the FTR button, this could result in a large unexpected movement by the rotorcraft and could result in a crash. The error monitors prevent these problems by detecting faulty detent sensors and faulty trim motors.

In accordance with an embodiment, a rotorcraft includes a control element; a first detent sensor connected to the control element, the first detent sensor being operable to generate detent slip rate data indicating movement of the control element and detent state data indicating pilot control of the control element; a first trim motor connected to the control element, the first trim motor being operable to generate trim rate data; and a flight control computer (FCC) in signal communication with the first detent sensor and the first trim motor, the FCC including an error monitor, the error monitor being operable to compare the detent slip rate data with the trim rate data and determine whether the first detent sensor is functional or defective, the FCC being further operable to provide a first flight management function when the first detent sensor is determined to be functional, and the FCC being further operable to provide a second flight management function when the first detent sensor is determined to be defective. In an embodiment, the error monitor is further operable to compare the detent state data with the detent slip rate data and the trim rate data to determine whether the first detent sensor is functional or defective. In an embodiment, the FCC is further operable to generate trim command data, and the error monitor is operable to detect whether the trim rate data is initiated by and in agreement with the trim command data and determine whether the first trim motor is functional or defective. In an embodiment, the FCC is further operable to provide the first flight management function when the first trim motor is determined to be functional, and the FCC is further operable to provide the second flight management function when the first trim motor is determined to be defective. In an embodiment, the error monitor is further operable to compare the detent state data with the trim rate data and the trim command data to determine whether the first trim motor is functional or defective. In an embodiment, the second flight management function turns off outer loop augmentation. In an embodiment, the error monitor is a persistence monitor.

In accordance with another embodiment, a flight control computer (FCC) for a rotorcraft includes a processor; and a non-transitory computer-readable storage medium storing a program to be executed by the processor, the program including instructions for monitoring a functionality of a first detent sensor connected to a first control element, the instructions for monitoring the functionality including instructions for receiving detent slip rate data from the first detent sensor indicating pilot commands to the first control element; receiving trim rate data from a trim motor connected to the first control element; comparing the trim rate data to the detent slip rate data; determining a functionality status of the first detent sensor according to the detent slip rate data and the trim rate data; and providing a first flight management function in response to the first detent sensor being determined to be functional, and providing a second flight management function in response to the first detent sensor being determined to be non-functional. In an embodiment, the instructions for monitoring the functionality further including instructions for receiving detent state data from the first detent sensor indicating whether the first control element is in an in-detent state or an out-of-detent state. In an embodiment, the instructions for monitoring the functionality further including instructions for increasing an error count when the detent state data indicates the first control element is in the in-detent state and the detent slip rate data is in conflict with the trim rate data. In an embodiment, the instructions for monitoring the functionality further include decreasing the error count when the detent state data indicates the first control element is in the in-detent state and the detent slip rate data is in agreement with the trim rate data. In an embodiment, the first detent sensor is determined to be functional in response to the error count being less than a threshold value, and the first detent sensor is determined to be non-functional in response to the error count being equal to or greater than the threshold value. In an embodiment, the instructions for monitoring the functionality further include instructions for comparing the trim rate data to the detent slip rate data; and determining a functionality status of the trim motor according to the comparison of the trim rate data to the detent slip rate data. In an embodiment, the first flight management function provides inner loop flight augmentation, rate loop flight augmentation, and outer loop flight augmentation, and the second flight management function turns off the outer loop flight augmentation.

In accordance with yet another embodiment, a method for operating a rotorcraft includes receiving control element rate data from a first detent sensor indicating pilot commands to a first control element, the first detent sensor being connected to the first control element; receiving trim rate data from a trim motor connected to the first control element; comparing the trim rate data to the control element rate data; determining a functionality status of the first detent sensor according to the control element rate and the trim rate data; and providing a first flight management function in response to the first detent sensor being determined to be functional, and providing a second flight management function in response to the first detent sensor being determined to be non-functional. In an embodiment, the method further includes receiving detent state data from the first detent sensor indicating whether the first control element is in an in-detent state or an out-of-detent state. In an embodiment, the method further includes increasing an error count when the detent state data indicates the first control element is in the in-detent state and the trim rate data is in disagreement with the control element rate data. In an embodiment, the method further includes decreasing the error count when the detent state data indicates the first control element is in the in-detent state and the trim rate data is in agreement with the control element rate data. In an embodiment, the functionality status of the first detent sensor is determined to be functional when the error count is less than a threshold value, and the functionality status of the first detent sensor is determined to be non-functional when the error count is equal to or greater than the threshold value. In an embodiment, the method further includes comparing the trim rate data to the control element rate data; determining a functionality status of the trim motor according to the trim rate data and the control element rate data; and providing a first flight management function in response to the trim motor being determined to be functional, and providing a second flight management function in response to the trim motor being determined to be non-functional.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A rotorcraft comprising:
a control element;
a first detent sensor connected to the control element, wherein the first detent sensor is operable to generate detent slip rate data indicating movement of the control element and detent state data indicating pilot control of the control element;
a first trim motor connected to the control element, wherein the first trim motor is operable to generate trim rate data; and
a flight control computer (FCC) in signal communication with the first detent sensor and the first trim motor, wherein the FCC is operable to compare the detent slip rate data with the trim rate data and determine whether the first detent sensor is functional or defective, wherein the FCC is further operable to generate trim command data and detect whether the trim rate data is initiated by, and in agreement with, the trim command data and determine whether the first trim motor is functional or defective, wherein the FCC is further operable to provide a first flight management function when the first detent sensor is determined to be functional, and wherein the FCC is further operable to provide a second flight management function when the first detent sensor is determined to be defective.

2. The rotorcraft of claim 1, wherein the FCC is further operable to compare the detent state data with the detent slip rate data and the trim rate data to determine whether the first detent sensor is functional or defective.

3. The rotorcraft of claim 2, wherein the FCC is further operable to provide the first flight management function when the first trim motor is determined to be functional, and wherein the FCC is further operable to provide the second flight management function when the first trim motor is determined to be defective.

4. The rotorcraft of claim 2, wherein the FCC is further operable to compare the detent state data with the trim rate data and the trim command data to determine whether the first trim motor is functional or defective.

5. The rotorcraft of claim 1, wherein the second flight management function turns off outer loop augmentation.

6. A flight control computer (FCC) for a rotorcraft comprising:
a processor; and
a non-transitory computer-readable storage medium storing a program to be executed by the processor, the program including instructions for monitoring a functionality of a first detent sensor connected to a first control element, the instructions for monitoring the functionality including instructions for:
receiving detent slip rate data from the first detent sensor indicating pilot commands to the first control element;
receiving trim rate data from a trim motor connected to the first control element;
comparing the trim rate data to the detent slip rate data;
increasing an error count in response to the first control element being in an in-detent state and the detent slip rate data being in conflict with the trim rate data;
determining a functionality status of the first detent sensor according to the detent slip rate data and the trim rate data, wherein the first detent sensor is determined to be non-functional in response to the error count being equal to or greater than a threshold value; and
providing a first flight management function in response to the first detent sensor being determined to be functional, and providing a second flight management function in response to the first detent sensor being determined to be non-functional.

7. The FCC of claim 6, wherein the instructions for monitoring the functionality further include instructions for receiving detent state data from the first detent sensor indicating whether the first control element is in the in-detent state or an out-of-detent state.

8. The FCC of claim 7, wherein the instructions for monitoring the functionality further comprise decreasing the error count when the detent state data indicates the first control element is in the in-detent state and the detent slip rate data is in agreement with the trim rate data.

9. The FCC of claim 7, wherein the first detent sensor is determined to be functional in response to the error count being less than the threshold value.

10. The FCC of claim 6, wherein the instructions for monitoring the functionality further include instructions for:
comparing the trim rate data to the detent slip rate data; and
determining a functionality status of the trim motor according to the comparison of the trim rate data to the detent slip rate data.

11. The FCC of claim 6, wherein the first flight management function provides inner loop flight augmentation, rate loop flight augmentation, and outer loop flight augmentation, and wherein the second flight management function turns off the outer loop flight augmentation.

12. A method for operating a rotorcraft comprising:
receiving control element rate data from a first detent sensor indicating pilot commands to a first control element, wherein the first detent sensor is connected to the first control element;
receiving trim rate data from a trim motor connected to the first control element;
comparing the trim rate data to the control element rate data;
increasing an error count in response to the first control element being in an in-detent state and the trim rate data being in disagreement with the control element rate data;

determining a functionality status of the first detent sensor according to the control element rate data and the trim rate data, wherein the functionality status of the first detent sensor is determined to be non-functional in response to the error count being equal to or greater than a threshold value; and providing a first flight management function in response to the first detent sensor being determined to be functional, and providing a second flight management function in response to the first detent sensor being determined to be non-functional.

13. The method of claim 12, further comprising receiving detent state data from the first detent sensor indicating whether the first control element is in the in-detent state or an out-of-detent state.

14. The method of claim 13, further comprising decreasing the error count when the detent state data indicates the first control element is in the in-detent state and the trim rate data is in agreement with the control element rate data.

15. The method of claim 13, wherein the functionality status of the first detent sensor is determined to be functional when the error count is less than the threshold value.

16. The method of claim 12, further comprising:
comparing the trim rate data to the control element rate data;
determining a functionality status of the trim motor according to the trim rate data and the control element rate data; and
providing the first flight management function in response to the trim motor being determined to be functional, and providing the second flight management function in response to the trim motor being determined to be non-functional.

* * * * *